US009606326B2

(12) United States Patent
Tang et al.

(10) Patent No.: US 9,606,326 B2
(45) Date of Patent: *Mar. 28, 2017

(54) OPTICAL IMAGE CAPTURING SYSTEM

(71) Applicant: ABILITY OPTO-ELECTRONICS TECHNOLOGY CO.LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 143 days.

This patent is subject to a terminal disclaimer.

(21) Appl. No.: 14/584,765

(22) Filed: Dec. 29, 2014

(65) Prior Publication Data

US 2016/0033747 A1    Feb. 4, 2016

(30) Foreign Application Priority Data

Jul. 29, 2014    (TW) .............................. 103125911 A

(51) Int. Cl.
*G02B 9/62*    (2006.01)
*G02B 13/18*    (2006.01)
(Continued)

(52) U.S. Cl.
CPC ............ *G02B 13/0045* (2013.01); *G02B 3/04* (2013.01); *G02B 5/005* (2013.01); *G02B 7/021* (2013.01);
(Continued)

(58) Field of Classification Search
CPC ...... G02B 13/0045; G02B 9/62; G02B 13/18; G02B 3/04; G02B 7/021; G02B 13/002; G02B 5/005; G02B 13/001; H04N 5/2254
(Continued)

(56) References Cited

U.S. PATENT DOCUMENTS

2013/0070346 A1    3/2013    Hsu et al.
2016/0004050 A1*   1/2016    Tang .................. G02B 13/0045
                                                         359/713
(Continued)

FOREIGN PATENT DOCUMENTS

JP    2014-13293 A    1/2014
JP    2014-38230 A    2/2014
(Continued)

*Primary Examiner* — Evelyn A Lester

(74) *Attorney, Agent, or Firm* — Muncy, Geissler, Olds & Lowe, P.C.

(57) ABSTRACT

An optical image capturing system, from an object side to an image side, comprises a first lens element, a second lens element, a third lens element, a fourth lens element, a fifth lens element, and a sixth lens element. The first lens element has a positive refractive power and may have a convex object-side surface. The second through fifth lens elements has a refractive power and the object-side and image-side surfaces of these lens elements are aspheric. The sixth lens element has a negative refractive power and may have a concave image-side surface. The object-side surface and the image-side surface of the sixth lens element are aspheric, and at least one of the two surfaces has inflection points. When specific conditions are satisfied, the optical image capturing system may has a large aperture value and a better optical path adjusting ability to acquire better imaging quality.

25 Claims, 15 Drawing Sheets

(51) Int. Cl.
*G02B 13/00* (2006.01)
*G02B 5/00* (2006.01)
*H04N 5/225* (2006.01)
*G02B 3/04* (2006.01)
*G02B 7/02* (2006.01)

(52) U.S. Cl.
CPC .............. *G02B 9/62* (2013.01); *G02B 13/001* (2013.01); *G02B 13/002* (2013.01); *G02B 13/18* (2013.01); *H04N 5/2254* (2013.01)

(58) Field of Classification Search
USPC .................................. 359/713, 740, 756–760
See application file for complete search history.

(56) References Cited

U.S. PATENT DOCUMENTS

2016/0018629 A1* 1/2016 Tang .................. G02B 13/0045
359/713
2016/0041369 A1* 2/2016 Tang ........................ G02B 9/62
359/713

FOREIGN PATENT DOCUMENTS

| TW | 201333575 A | 8/2013 |
|---|---|---|
| TW | 201344237 A | 11/2013 |

\* cited by examiner

US 9,606,326 B2

OPTICAL IMAGE CAPTURING SYSTEM

CROSS-REFERENCE TO RELATED APPLICATION

This application claims the benefit of Taiwan Patent Application No. 103125911, filed on Jul. 29, 2014, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The traditional optical image capturing system of a portable electronic device comes with different designs, including a four-lens or a five-lens design. However, the requirement for the higher resolution and imaging quality and the requirement for a large aperture of an end user, like functionality of micro filming and night view, and a wide angle of an end user, like self-shooting function of a preset lens, of the portable electronic device have been raised. The optical image capturing system with large aperture value usually has a problem with lots of aberrations, resulting in the worse of image quality for the image formation and the difficulty of manufacturing the optical image capturing system. The optical image capturing system with wide-angle designs may be faced with a problem of increasing distortion. The optical image capturing system in prior arts cannot meet the requirement of the higher order camera lens module.

Therefore, how to increase an incoming light quantity of the optical lenses for image formation and enlarge the view angle of the optical lenses becomes important. Besides, it's also important to increase total pixels and image quality for the image formation and to have a balance design for the compact optical image capturing system simultaneously.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the geometrical shape of an image-side surface or an object-side surface of each lens element on an optical axis) to further increase an incoming light quantity of the optical image capturing system effectively, to increase view angle of the optical image capturing system, and to increase a total pixel and improve imaging quality for image formation, to be applied to minimized electronic products.

The term and its definition to the lens element parameter in the embodiment of the present are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the sixth lens element is denoted by InTL. A distance from the image-side surface of the sixth lens element to the image plane is denoted by InB. InTL+InB=HOS. A distance from an aperture stop (aperture) to an image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP.

The Lens Element Parameter Related to a Depth of the Lens Element Shape

A distance in parallel with an optical axis from a maximum effective diameter position to an axial point on the object-side surface of the sixth lens element is denoted by InRS61 (instance). A distance in parallel with an optical axis from a maximum effective diameter position to an axial point on the image-side surface of the sixth lens element is denoted by InRS62 (instance). A distance in parallel with an optical axis from an inflection point to an axial point on the object-side surface of the sixth lens element is Inf61 (instance). A distance in parallel with an optical axis from an inflection point to an axial point on the image-side surface of the sixth lens element is Inf62 (instance).

The Lens Element Parameter Related to the Lens Element Shape

A critical point is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point on the object-side surface of the fifth lens element and the optical axis is HVT51. A distance perpendicular to the optical axis between a critical point on the image-side surface of the fifth lens element and the optical axis is HVT52. A distance perpendicular to the optical axis between a critical point on the object-side surface of the sixth lens element and the optical axis is HVT61. A distance perpendicular to the optical axis between a critical point on the image-side surface of the sixth lens element and the optical axis is HVT62.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%~100% field. An offset of the spherical aberration is denoted by DFS. An offset of the coma aberration is denoted by DFC.

The disclosure provides an optical image capturing system, an object-side surface or an image-side surface of the sixth lens element has inflection points, such that the angle of incidence from each view field to the sixth lens element can be adjusted effectively and the optical distortion and the TV distortion can be corrected as well. Besides, the surfaces of the sixth lens element may have a better optical path adjusting ability to acquire better imaging quality.

The disclosure provides an optical image capturing system, in order from an object side to an image side, including a first lens element, a second lens element, a third lens element, a fourth lens element, a fifth lens element, and a sixth lens element. The first lens element has a positive refractive power and the sixth lens element has a negative refractive power. The object-side surface and the image-side surface of the first lens element are aspheric and the object-side surface and the image-side surface of the sixth lens element are aspheric. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. The following relation is satisfied: 0≤|f/f1|≤2, 1.2≤f/HEP≤2.8, 0.4≤|tan(HAF)|≤1.5, and 0.5≤HOS/f≤2.5.

The disclosure provides another optical image capturing system, in order from an object side to an image side, including a first lens element, a second lens element, a third lens element, a fourth lens element, a fifth lens element, and a sixth lens element. The first lens element with a positive refractive power may have a convex object-side surface adjacent to the optical axis, and an image-side surface and the object-side surface of the first lens element are aspheric. The second lens element has a negative refractive power. The third lens element has a refractive power. The fourth lens element has a refractive power. The fifth lens element has a refractive power. The sixth lens element has a negative refractive power, and an object-side surface and an image-side surface of the sixth lens element are aspheric. The object-side surface and the image-side surface of the first lens element and the sixth lens element are aspheric, correspondingly. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. Optical distortion and TV distortion for image formation in the optical image capturing system are ODT and TDT, respectively. The following relation is satisfied: 0≤|f/f1|2, 1.2≤f/HEP≤2.8, 0.4≤|tan(HAF)|≤1.5, 0.5≤HOS/f≤2.5, |TDT|<1.5%, and |ODT|≤2.5%.

The disclosure provides another optical image capturing system, in order from an object side to an image side, including a first lens element, a second lens element, a third lens element, a fourth lens element, a fifth lens element, and a sixth lens element. The first lens element with a positive refractive power may have a convex object-side surface adjacent to the optical axis, and an image-side surface and the object-side surface of the first lens element are aspheric. The second lens element has a negative refractive power. The third lens element with a positive refractive power has a convex object-side surface adjacent to the optical axis. The fourth lens element has a positive refractive power. The fifth lens element has a negative refractive power. The sixth lens element with a negative refractive power has a concave image-side surface adjacent to the optical axis, and the image-side surface and a object-side surface of the sixth lens element are aspheric. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. Optical distortion and TV distortion for image formation in the optical image capturing system are ODT and TDT, respectively. The following relation is satisfied: 0≤|f/f1|≤2, 1.2≤f/HEP≤2.8, 0.4≤|tan(HAF)|≤1.5, 0.5≤HOS/f≤2.5, |TDT|<1.5%, and |ODT|≤2.5%.

An image sensing device whose length of diagonal is less than 1/1.2 inch may be applied to the aforementioned optical image capturing system. A better size of the image sensing device is 1/2.3 inch. The pixel size of the image sensing device is less than 1.4 (μm). A better pixel size of the image sensing device is less than 1.12 (μm). A best pixel size of the image sensing device is less than 0.9 (μm). Besides, the optical image capturing system can be applied to the image sensing device with an aspect ratio of 16:9.

The above optical image capturing system can be applied to a demand of taking a photography having ten million pixels or more, such as UHD (Ultra High Definition) and QHD (Quarter High Definition), and has a high quality image formation.

The height of optical system (HOS) can be reduced to achieve the minimization of the optical image capturing system when an absolute value of f1 is larger than f6 (|f1|>f6).

When |f/f1| is satisfied with the above conditions, the arrangement of the refractive power of the first lens element can avoid generating the abnormal aberration that cannot be corrected. When a sum of |f2|, |f3|, |f4|, and |f5| is larger than a sum of |f1| and |f6|, at least one of the second through fifth lens elements has a weak positive refractive power or a weak negative refractive power. The weak refractive power indicates an absolute value of the focal length of a specific lens element is greater than 10. When at least one of the second through fifth lens elements has the weak positive refractive power, the positive refractive power of the first lens element can be shared, such that the unnecessary aberration will not appear too early. On the contrary, when at least one of the second through fifth lens elements has the weak negative refractive power, the aberration of the optical image capturing system can be corrected and fine tuned.

The sixth lens element with a negative refractive power may have a concave image-side surface. Hereby, the back focal length is reduced for maintaining the miniaturization, to miniaturize the lens element effectively. In addition, at least one of the object-side and the image-side surfaces of the sixth lens elements may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
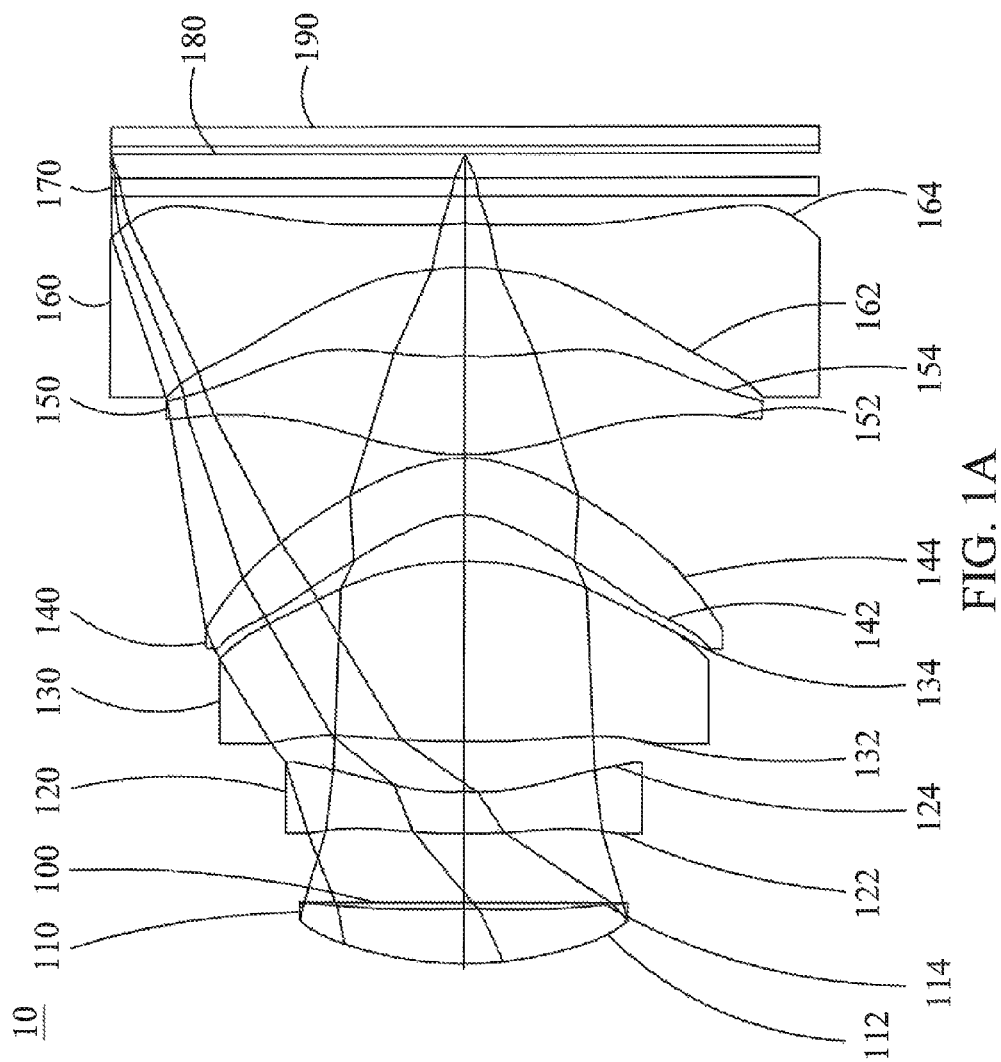
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first lens element with a refractive power, a second lens element with a refractive power, a third lens element with a refractive power, a fourth lens element with a refractive power, a fifth lens element with a refractive power, and a sixth lens element with a refractive power. The optical image capturing system may further include an image sensing device which is disposed on an image plane.

A ratio of the focal length f of the optical image capturing system to a focal length fp of each of lens elements with a positive refractive power is PPR. A ratio of the focal length f of the optical image capturing system to a focal length fn of each of lens elements with a negative refractive power is NPR. A sum of the PPR of all lens elements with positive refractive powers is ΣPPR. A sum of the NPR of all lens elements with negative refractive powers is ΣNPR. It is beneficial to control the total refractive power and the total length of the optical image capturing system when following conditions are satisfied: $0.5 \leq \Sigma PPR/|\Sigma NPR| \leq 2$. Preferably, the following relation may be satisfied: $1 \leq \Sigma PPR/|\Sigma NPR| \leq 1.5$.

Height of the optical image capturing system is HOS. When the ratio of HOS/f is closed to 1, its favorable for manufacturing a minimized optical image capturing system for image formation with ultra-high pixels.

In an embodiment of the optical image capturing system, the first lens element, the third lens element, and the fourth lens element may have a positive refractive power. A focal length of the first lens element is f1. A focal length of the third lens element is f3. A focal length of the fourth lens element is f4. $0 < (f/f1)+(f/f3)+(f/f4) \leq 5$ and $f1/(f1+f3+f4) \leq 0.85$. Preferably, the following relation may be satisfied: $0 < (f/f1)+(f/f3)+(f/f4) \leq 3.5$ and $0.01 \leq f1/(f1+f3+f4) \leq 0.4$. Hereby, the ability of focusing of the optical image capturing system can be controlled helpfully and the positive refractive power of the optical image capturing system can be allocated properly and the early generated significant aberrations can be suppressed.

The first lens element with a positive refractive power has a convex object-side surface and may have a concave image-side surface. Hereby, the strength of the positive refractive power of the first lens element can be fine-tuned to reduce the total length of the optical image capturing system.

The second lens element may have a negative refractive power, a convex object-side surface and a concave image-side surface. Hereby, the aberration generated by the first lens element can be corrected.

The third lens element may have a positive refractive power and a convex object-side surface. Hereby, the positive refractive power of the first lens element can be shared, to avoid the longitudinal spherical aberration to increase abnormally and to decrease the sensitivity of the optical image capturing system.

The fourth lens element may have a positive refractive power, a convex image-side surface. Hereby, the positive refractive power of the first lens element can be shared, to avoid the aberration to increase abnormally and to decrease the sensitivity of the optical image capturing system.

The fifth lens element may have a negative refractive power, such that the spherical aberration can be improved by adjusting the angle of incidence from each view field to the fifth lens element effectively.

The sixth lens element with a negative refractive power may have a concave image-side surface. Hereby, the back focal length is reduced for maintaining the miniaturization, to miniaturize the lens element effectively. In addition, at least one of the object-side and the image-side surfaces of the sixth lens elements may have at least one inflection point, such that the angle of incident with incoming light from an off-axis view field can be suppressed effectively and the aberration in the off-axis view field can be corrected further. Preferably, each of the object-side surface and the image-side surface of the sixth lens element has at least one inflection point.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relation is satisfied: HOS/HOI≤3 and 0.5≤HOS/f≤2.5. Preferably, the following relation may be satisfied: 1≤HOS/HOI≤2.5 and 1≤HOS/f≤2. Hereby, the miniaturization of the optical image capturing system can be maintained effectively, to be carried by lightweight portable electronic devices.

In addition, in the optical image capturing system of the disclosure, according to different requirements, at least one aperture stops may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image-side surface of the sixth lens element is InS. The following relation is satisfied: 0.6≤InS/HOS≤1.1. Preferably, the following relation may be satisfied: 0.8≤InS/HOS≤1. Hereby, features of maintaining the minimization for the optical image capturing system and having wide-angle are available simultaneously.

In the optical image capturing system of the disclosure, a distance from the object-side surface of the first lens element to the image-side surface of the sixth lens element is InTL. A total central thickness of all lens elements with refractive powers on the optical axis is ΣTP. The following relation is satisfied: 0.45≤ΣTP/InTL≤0.95. Hereby, contrast ratio for the image formation in the optical image capturing system and defect-free rate for manufacturing the lens element can be given consideration simultaneously, and a proper back focal length is provided to dispose others optical components in the optical image capturing system.

A curvature radius of the object-side surface of the first lens element is R1. A curvature radius of the image-side surface of the first lens element is R2. The following relation is satisfied: 0.1≤|R1/R2|≤0.5. Hereby, the first lens element may have proper strength of the positive refractive power, to avoid the longitudinal spherical aberration to increase too fast. Preferably, the following relation may be satisfied: 0.2≤|R1/R2|≤0.45.

A curvature radius of the object-side surface of the sixth lens element is R11. A curvature radius of the image-side surface of the sixth lens element is R12. The following relation is satisfied: −10<(R11−R12)/(R11+R12)<30. Hereby, the astigmatic generated by the optical image capturing system can be corrected beneficially.

A distance between the first lens element and the second lens element on the optical axis is IN12. The following relation is satisfied: 0<IN12/f≤0.25. Preferably, the following relation may be satisfied: 0.01≤IN12/f≤0.20. Hereby, the aberration of the lens elements can be improved, such that the performance can be increased.

Central thicknesses of the first lens element and the second lens element on the optical axis are TP1 and TP2, respectively. The following relation is satisfied: 1≤(TP1+IN12)/TP2≤10. Hereby, the sensitivity produced by the optical image capturing system can be controlled, such that the performance can be increased.

Central thicknesses of the fifth lens element and the sixth lens element on the optical axis are TP5 and TP6, respectively, and a distance between the fifth lens element and the sixth lens element on the optical axis is IN56. The following relation is satisfied: 0.2≤(TP6+IN56)/TP5≤3. Hereby, the sensitivity produced by the optical image capturing system can be controlled and the total height of the optical image capturing system can be reduced.

Central thicknesses of the third lens element, the fourth lens element, and the fifth lens element on the optical axis are TP3, TP4, and TP5, respectively. A distance between the third lens element and the fourth lens element on the optical axis is IN34. A distance between the fourth lens element and the fifth lens element on the optical axis is IN45. A distance from the object-side surface of the first lens element to the image-side surface of the sixth lens element is InTL, The following relation is satisfied: 0.1≤(TP3+TP4+TP5)/ΣTP≤0.8. Preferably, the following relation may be satisfied: 0.4≤(TP3+TP4+TP5)/ΣTP≤0.8. Hereby, the aberration generated by the process of moving the incident light can be adjusted slightly layer upon layer, and the total height of the optical image capturing system can be reduced.

A distance in parallel with an optical axis from a maximum effective diameter position to an axial point on the object-side surface of the fifth lens element is InRS51 (the InRS51 is positive if the horizontal displacement is toward the image-side surface, or the InRS51 is negative if the horizontal displacement is toward the object-side surface). A distance in parallel with an optical axis from a maximum effective diameter position to an axial point on the image-side surface of the fifth lens element is InRS52. A central thickness of the fifth lens element is TP5. The following relation is satisfied: 0≤|InRS52|/TP5<5. Hereby, it's favorable for manufacturing and forming the lens element and for maintaining the minimization for the optical image capturing system.

A distance perpendicular to the optical axis between a critical point on the object-side surface of the fifth lens element and the optical axis is HVT51. A distance perpendicular to the optical axis between a critical point on the image-side surface of the fifth lens element and the optical axis is HVT52. The following relation is satisfied: 0≤HVT51/HVT52. Hereby, the aberration of the off-axis view field can be corrected effectively.

A distance in parallel with an optical axis from a maximum effective diameter position to an axial point on the object-side surface of the sixth lens element is InRS61. A distance in parallel with an optical axis from a maximum effective diameter position to an axial point on the image-side surface of the sixth lens element is InRS62. A central thickness of the sixth lens element is TP6. The following relation is satisfied: 0<|InRS62|/TP6<3. Hereby, it's favorable for manufacturing and forming the lens element and for maintaining the minimization for the optical image capturing system.

A distance perpendicular to the optical axis between a critical point on the object-side surface of the sixth lens element and the optical axis is HVT61. A distance perpendicular to the optical axis between a critical point on the image-side surface of the sixth lens element and the optical axis is HVT62. The following relation is satisfied: 0≤HVT61/HVT62. Hereby, the aberration of the off-axis view field can be corrected effectively.

The following relation is satisfied for the optical image capturing system of the disclosure: 0.2≤HVT62/HOI≤0.9. Preferably, the following relation may be satisfied: 0.3≤HVT62/HOI≤0.7. Hereby, the aberration of surrounding view field for the optical image capturing system can be corrected beneficially.

The following relation is satisfied for the optical image capturing system of the disclosure: 0≤HVT62/HOS≤0.5. Preferably, the following relation may be satisfied: 0.2≤HVT62/HOS≤0.4. Hereby, the aberration of surrounding view field for the optical image capturing system can be corrected beneficially.

A distance in parallel with an optical axis from an inflection point to an axial point on the object-side surface of the sixth lens element is denoted by Inf61. A distance in parallel with an optical axis from an inflection point to an axial point on the image-side surface of the sixth lens element is denoted by Inf52. The following relation is satisfied: 0<Inf62/(Inf62+CT6)≤5. Preferably, the following relation may be satisfied: 1.8≤Inf62/(Inf62+CT6)≤4.7.

The following relation is satisfied for the optical image capturing system of the disclosure: 1 mm≤|InRS52|+|InRS61|≤55 mm. Preferably, the following relation may be satisfied: 1.5 mm≤|InRS52|+|InRS61|≤3.5 mm. Thus, it's favorable for correcting the aberration of surrounding view field for the optical image capturing system by controlling a distance of a maximum effective diameter between the image-side surface of the fifth lens element and the object-side surface of the sixth lens element.

The following relation is satisfied for the optical image capturing system of the disclosure: 0≤Inf62/|InRS62|≤120. Hereby, a depth of the maximum effective diameter and positions of appearing inflection points on the image-side surface of the sixth lens element can be controlled, to correct the aberration of off-axis view field and maintain the minimization for the optical image capturing system effectively.

In one embodiment of the optical image capturing system of the present disclosure, the chromatic aberration of the optical image capturing system can be corrected by staggering the lens element with high dispersion coefficient and the lens element with low dispersion coefficient.

The above Aspheric formula is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+ \quad (1),$$

where z is a position value of the position along the optical axis and at the height h which reference to the surface apex; k is the conic coefficient, c is the reciprocal of curvature radius, and A4, A6, A8, A10, A12, A14, A16, A18, and A20 are high level aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through sixth lens elements may be aspheric, so as to obtain more control variables. Comparing with the usage of traditional lens element made by glass, the number of using lens elements can be reduced and the aberration can be eliminated. Therefore, the total height of the optical image capturing system can be reduced effectively.

In addition, in the optical image capturing system provided of the disclosure, the lens element has a convex surface if the surface of the lens element is convex adjacent to the optical axis. The lens element has a concave surface if the surface of the lens element is concaving adjacent to the optical axis.

In addition, in the optical image capturing system of the disclosure, according to different requirements, at least one aperture stop may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras.

The optical image capturing system of the disclosure can be adapted to the optical image capturing system with automatic focus if required. With the features of a good aberration correction and a high quality of image formation, the optical image capturing system can be used in various application fields.

According to the above embodiments, the specific embodiments with figures are presented in detailed as below.

The First Embodiment

Embodiment 1

Figure 1B:
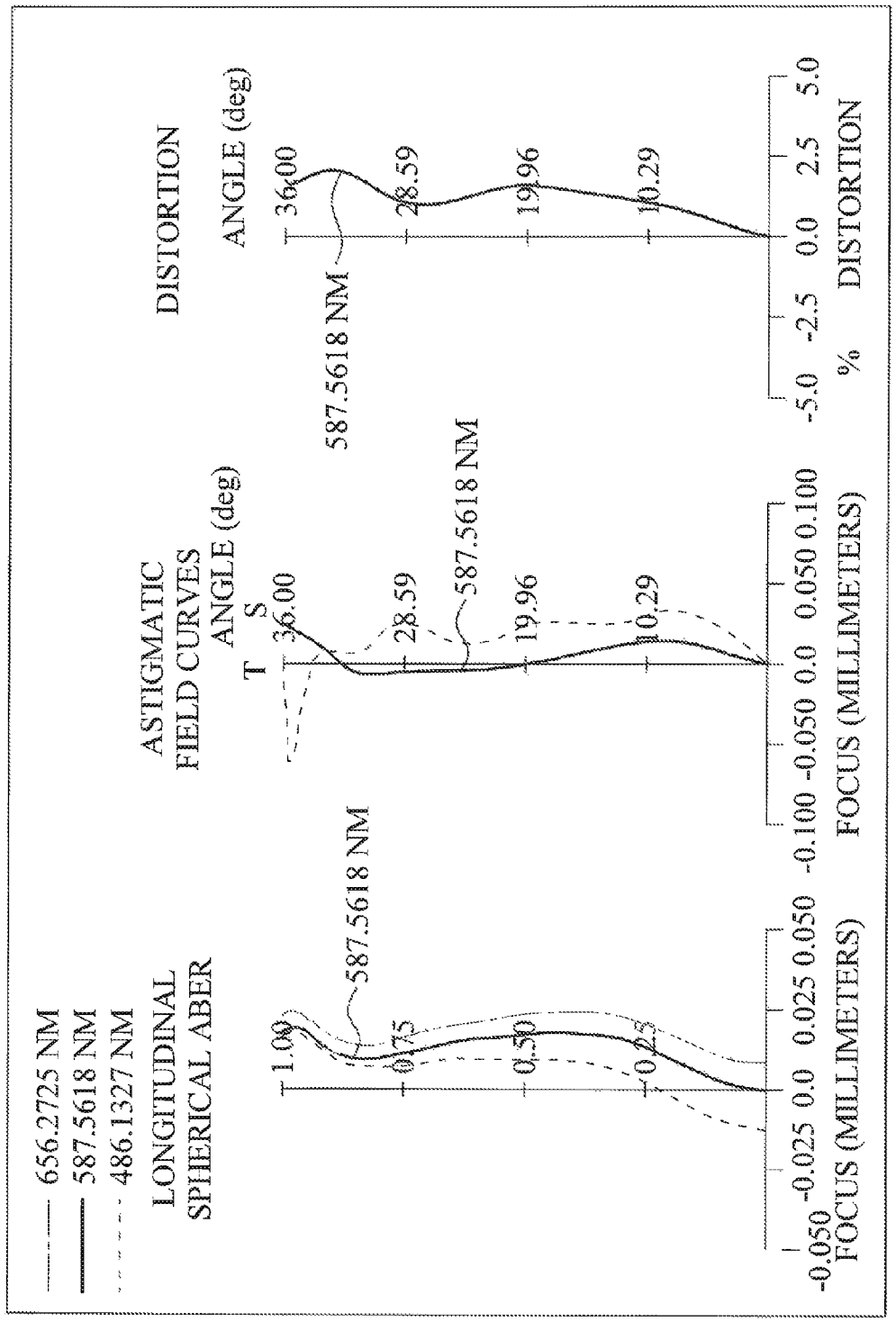
FIG. 1B is longitudinal spherical aberration curves, astigmatic field curves, and an optical distortion grid of the optical image capturing system in the order from left to right according to the first embodiment of the present application.
Figure 1C:
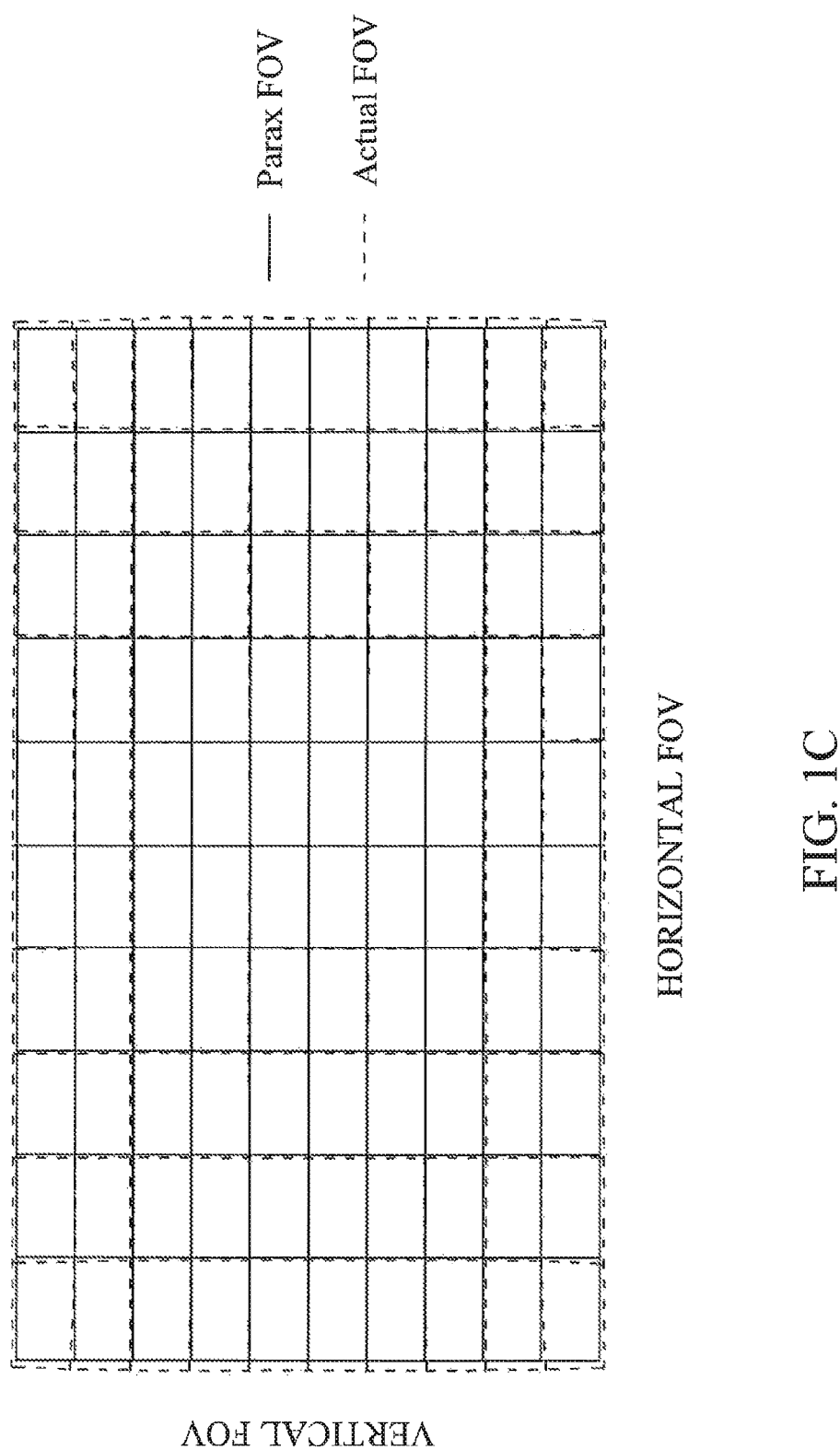
FIG. 1C is a TV distortion grid of the optical image capturing system according to the first embodiment of the present application.

Please refer to FIG. 1A, FIG. 1B, and FIG. 1C, FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a TV distortion grid of the optical image capturing system according to the first embodiment of the present application. As shown in FIG. 1A, in order from an object side to an image side, the optical image capturing system includes a first lens element 110, an aperture stop 100, a second lens element 120, a third lens element 130, a fourth lens element 140, a fifth lens element 150, a sixth lens element 160, an IR-bandstop filter 170, an image plane 180, and an image sensing device 190.

The first lens element 110 has a positive refractive power and it is made of plastic material. The first lens element 110 has a convex object-side surface 112 and a concave image-side surface 114, and both of the object-side surface 112 and the image-side surface 114 are aspheric.

The second lens element 120 has a negative refractive power and it is made of plastic material. The second lens element 120 has a convex object-side surface 122 and a concave image-side surface 124, and both of the object-side surface 122 and the image-side surface 124 are aspheric.

The third lens element 130 has a positive refractive power and it is made of plastic material. The third lens element 130 has a convex object-side surface 132 and a convex image-side surface 134, and both of the object-side surface 132 and the image-side surface 134 are aspheric.

The fourth lens element 140 has a negative refractive power and it is made of plastic material. The fourth lens element 140 has a concave object-side surface 142 and a convex image-side surface 144, and both of the object-side surface 142 and the image-side surface 144 are aspheric.

The fifth lens element 150 has a positive refractive power and it is made of plastic material. The fifth lens element 150 has a convex object-side surface 152 and a convex image-side surface 154, both of the object-side surface 152 and the image-side surface 154 are aspheric, and the object-side surface 152 has inflection points.

The sixth lens element 160 has a negative refractive power and it is made of plastic material. The fifth lens element 160 has a concave object-side surface 162 and a concave image-side surface 164, both of the object-side surface 162 and the image-side surface 164 are aspheric, and the image-side surface 164 has inflection points.

The IR-bandstop filter 180 is made of glass material without affecting the focal length of the optical image capturing system and it is disposed between the sixth lens element 160 and the image plane 170.

In the first embodiment of the optical image capturing system, a focal length of the optical image capturing system is f, an entrance pupil diameter of the optical image capturing system is HEP, and half of a maximal view angle of the optical image capturing system is HAF. The detailed parameters are shown as below: f=5.2905 mm, f/HEP=1.4, HAF=36 degree, and tan(HAF)=0.7265.

In the first embodiment of the optical image capturing system, a focal length of the first lens element 110 is f1 and a focal length of the sixth lens element 160 is f6. The following relation is satisfied: f1=7.984 mm, |f/f1|=0.6626, f6=−6.1818 mm, |f1|>f6, and |f1/f6|=1.2915.

In the first embodiment of the optical image capturing system, focal lengths of the second lens element 120, the third lens element 130, the fourth lens element 140, and the fifth lens element 150 are f2, f3, f4, and f5, respectively. The following relation is satisfied: |f2|+|f3|+|f4|+|f5|=27.9195 mm, |f1|+|f6|=14.1658 mm, and |f2|+|f3|+|f4|+|f5|+|f6|>|f1|+|f6|.

A ratio of the focal length f of the optical image capturing system to a focal length fp of each of lens elements with a positive refractive power is PPR. A ratio of the focal length f of the optical image capturing system to a focal length fn of each of lens elements with a negative refractive power is NPR. In the first embodiment of the optical image capturing system, a sum of the PPR of all lens elements with the positive refractive power is ΣPPR=f/f1+f/f3+f/f5=2.7814. A sum of the NPR of all lens elements with the negative refractive power is ΣNPR=f/f2+f/f4+f/f6=−2.0611. ΣPPR/|ΣNPR|=1.3494.

In the first embodiment of the optical image capturing system, a distance from the object-side surface 112 of the first lens element to the image-side surface 164 of the sixth lens element is InTL. A distance from the object-side surface 112 of the first lens element to the image plane 180 is HOS. A distance from an aperture stop 100 to an image plane 180 is InS. Half of a diagonal of an effective detection field of the image sensing device 190 is HOI. A distance from the image-side surface 164 of the sixth lens element to the image plane 180 is InB. The following relation is satisfied: InTL+InB=HOS, HOS=8.9645 mm, HOI=3.913 mm, HOS/HOI=2.2910, HOS/f=1.6945, InS=8.3101 mm, and InS/HOS=0.927.

In the first embodiment of the optical image capturing system, a total central thickness of all lens elements with refractive powers on the optical axis is ΣTP. The following relation is satisfied: ΣTP=5.2801 mm and ΣTP/InTL=0.6445. Hereby, contrast ratio for the image formation in the optical image capturing system and defect-free rate for manufacturing the lens element can be given consideration simultaneously, and a proper back focal length is provided to dispose others optical components in the optical image capturing system.

In the first embodiment of the optical image capturing system, a curvature radius of the object-side surface 112 of the first lens element is R1 and a curvature radius of the image-side surface 114 of the first lens element is R2. The following relation is satisfied: |R1/R2|=0.598. Hereby, the first lens element may have proper strength of the positive refractive power to avoid the longitudinal spherical aberration to increase too fast.

In the first embodiment of the optical image capturing system, a curvature radius of the object-side surface 162 of the sixth lens element is R11 and a curvature radius of the image-side surface 164 of the sixth lens element is R12. The following relation is satisfied: (R11−R12)/(R11+R12)=−0.7976. Hereby, the astigmatic generated by the optical image capturing system can be corrected beneficially.

In the first embodiment of the optical image capturing system, focal lengths of the first lens element 110, the third lens element 130, and the fifth lens element 150 are f1, f3, and f5, respectively. A sum of focal lengths of all lens elements with positive refractive powers is ΣPP. The following relation is satisfied: ΣPP=f1+f3+f5=18.3455 mm and f1/(f1+f3+f5)=0.4352. Hereby, it's favorable for allocating the positive refractive power of the first lens element 110 to others convex lens elements, and the significant aberrations generated in the process of moving the incident light can be suppressed.

In the first embodiment of the optical image capturing system, focal lengths of the second lens element 120, the fourth lens element 140, and the sixth lens element 160 are f2, f4, and f6, respectively. A sum of focal lengths of all lens elements with negative refractive powers is ΣNP. The following relation is satisfied: ΣNP=f2+f4+f6=−23.7398 mm and f6/(f2+f4+f6)=0.3724. Hereby, it's favorable for allocating the negative refractive power of the sixth lens element to others concave lens elements, and the significant aberrations generated in the process of moving the incident light can be suppressed.

In the first embodiment of the optical image capturing system, a distance between the first lens element 110 and the second lens element 120 on the optical axis is IN12. The following relation is satisfied: IN12=0.8266 mm and IN12/f=0.1562. Hereby, the aberration of the lens elements can be improved, such that the performance can be increased.

In the first embodiment of the optical image capturing system, central thicknesses of the first lens element 110 and the second lens element 120 on the optical axis are TP1 and TP2, respectively. The following relation is satisfied: TP1=0.6065 mm, TP2=0.4574 mm, and (TP1+INI2)/TP2=3.1331. Hereby, the sensitivity produced by the optical image capturing system can be controlled, such that the performance can be increased.

In the first embodiment of the optical image capturing system, central thicknesses of the fifth lens element 150 and the sixth lens element 160 on the optical axis are TP5 and TP6, respectively, and a distance between the fifth lens element 150 and the sixth lens element 160 on the optical axis is IN56. The following relation is satisfied: TP5=1.0952 mm, TP6=0.4789 mm and (TP6+IN56)/TP5=1.3378. Hereby, the sensitivity produced by the optical image capturing system can be controlled and the total height of the optical image capturing system can be reduced.

In the first embodiment of the optical image capturing system, Central thicknesses of the third lens element 130, the fourth lens element 140, and the fifth lens element 150 on the optical axis are TP3, TP4, and TP5, respectively. A distance between the third lens element 130 and the fourth lens element 140 on the optical axis is IN34. A distance between the fourth lens element 140 and the fifth lens element 150 on the optical axis is IN45. The following relation is satisfied: TP3=2.0138 mm, TP4=0.6283 mm, TP5=1.0952 mm, and (TP3+TP4+TP5)/ΣTP=0.5843. Hereby, the aberration generated by the process of moving the incident light can be adjusted slightly layer upon layer, and the total height of the optical image capturing system can be reduced.

In the first embodiment of the optical image capturing system, a distance in parallel with an optical axis from a maximum effective diameter position to an axial point on the object-side surface 152 of the fifth lens element is InRS51. A distance in parallel with an optical axis from a maximum effective diameter position to an axial point on the image-side surface 154 of the fifth lens element is InRS52. A central thickness of the fifth lens element 150 is TP5. The following relation is satisfied: InRS51=0.3945 mm, InRS52=−0.5015 mm, and |InRS52|/TP5=0.4579. Hereby, it's favorable for manufacturing and forming the lens element and for maintaining the minimization for the optical image capturing system.

In the first embodiment of the optical image capturing system, a distance perpendicular to the optical axis between a critical point on the object-side surface 152 of the fifth lens element and the optical axis is HVT51. A distance perpendicular to the optical axis between a critical point on the image-side surface 154 of the fifth lens element and the optical axis is HVT52. The following relation is satisfied: HVT51=2.3446 mm and HVT52=1.2401 mm.

In the first embodiment of the optical image capturing system, a distance in parallel with an optical axis from an inflection point to an axial point on the object-side surface 152 of the fifth lens element is Inf51. A distance in parallel with an optical axis from an inflection point to an axial point on the image-side surface 154 of the fifth lens element is Inf52. The following relation is satisfied: Inf51=0.4427 mm, Inf52=0.0638 mm, HVT52/(Inf52+CT5)=1.070, and $\tan^{-1}$(HVT52/(Inf52+CT5))=46.9368 degree.

In the first embodiment of the optical image capturing system, a distance in parallel with an optical axis from a maximum effective diameter position to an axial point on the object-side surface 162 of the sixth lens element is InRS61. A distance in parallel with an optical axis from a maximum effective diameter position to an axial point on the image-side surface 164 of the sixth lens element is InRS62. A central thickness of the sixth lens element 160 is TP6. The following relation is satisfied: InRS61=−1.4393 mm, InRS62=−0.1489 mm, and |InRS62|/TP6=0.3109. Hereby, its favorable for manufacturing and forming the lens element and for maintaining the minimization for the optical image capturing system.

In the first embodiment of the optical image capturing system, a distance perpendicular to the optical axis between a critical point on the object-side surface 162 of the sixth lens element and the optical axis is HVT61. A distance perpendicular to the optical axis between a critical point on the image-side surface 164 of the sixth lens element and the optical axis is HVT62. The following relation is satisfied: HVT61=0 mm, HVT62=3.1461 mm, and HVT61/HVT62=0. Hereby, the aberration of the off-axis view field can be corrected effectively.

In the first embodiment of the optical image capturing system, the following relation is satisfied: HVT62/HOI=0.8040. Hereby, the aberration of surrounding view field for the optical image capturing system can be corrected beneficially.

In the first embodiment of the optical image capturing system, the following relation is satisfied: HVT62 HOS=0.3510. Hereby, the aberration of surrounding view field for the optical image capturing system can be corrected beneficially.

In the first embodiment of the optical image capturing system, a distance in parallel with an optical axis from an inflection point to an axial point on the object-side surface 162 of the sixth lens element is denoted by Inf61. A distance in parallel with an optical axis from an inflection point to an axial point on the image-side surface 164 of the sixth lens element is denoted by Inf62. The following relation is satisfied: Inf61=0 mm, Inf62=0.1954 mm, HVT62/(Inf62+CT6)=4.6657, and $\tan^{-1}$(HVT62/(Inf62+CT6)=77.9028 degree.

In the first embodiment of the optical image capturing system, the following relation is satisfied: |InRS52|+|InRS61|=1.9408 mm. Thus, it's favorable for correcting the aberration of surrounding view field for the optical image capturing system by controlling a distance of a maximum effective diameter between the image-side surface of the fifth lens element 150 and the object-side surface of the sixth lens element 160.

In the first embodiment of the optical image capturing system, the following relation is satisfied: Inf62/|InRS62|=1.3123. Hereby, a depth of the maximum effective diameter and positions of appearing inflection points on the image-side surface 164 of the sixth lens element 160 can be controlled, to correct the aberration of off-axis view field and maintain the minimization for the optical image capturing system effectively.

In the first embodiment of the optical image capturing system, the second lens element 120, the fourth lens element 140, and the sixth lens element 160 have negative refractive powers. An Abbe number of the second lens element is NA2. An Abbe number of the fourth lens element is NA4. An Abbe number of the sixth lens element is NA6. The following relation is satisfied: 1≤NA6/NA2. Hereby, the aberration for the optical image capturing system can be corrected beneficially.

In the first embodiment of the optical image capturing system, TV distortion for image formation in the optical image capturing system is TDT and optical distortion for image formation in the optical image capturing is ODT. The following relation is satisfied: |TDT|=0.96% and |ODT|=1.9485%.

Please refer to the following Table 1 and Table 2.

The detailed data of the optical image capturing system of the first embodiment is as shown in Table 1.

TABLE 1

Data of the optical image capturing system
f = 5.2905 mm, f/HEP = 1.4, HAF = 32 deg, tan(HAF) = 0.7265

| Surface # | | Curvature Radius | Thickness | Material | Index | Abbe # | Focal length |
|---|---|---|---|---|---|---|---|
| 0 | Object | Plano | INFINITY | | | | |
| 1 | Lens 1 | 4.2552 | 0.6065 | Plastic | 1.565 | 54.5 | 7.984 |
| 2 | | 71.1925 | 0.0480 | | | | |
| 3 | Ape. stop | Plano | 0.7787 | | | | |
| 4 | Lens 2 | 6.0791 | 0.4574 | Plastic | 1.65 | 21.4 | −8.8412 |
| 5 | | 2.8666 | 0.5561 | | | | |
| 6 | Lens 3 | 10.2020 | 2.0138 | Plastic | 1.565 | 58 | 4.1972 |
| 7 | | −2.8694 | 0.4940 | | | | |
| 8 | Lens 4 | −1.0612 | 0.6283 | Plastic | 1.565 | 54.5 | −8.7168 |
| 9 | | −1.6418 | 0.0500 | | | | |
| 10 | Lens 5 | 2.3012 | 1.0952 | Plastic | 1.565 | 58 | 6.1643 |
| 11 | | 5.6173 | 0.9863 | | | | |
| 12 | Lens 6 | −3.1756 | 0.4789 | Plastic | 1.583 | 30.2 | −6.1818 |
| 13 | | −28.2003 | 0.3000 | | | | |
| 14 | IR-bandstop filter | Plano | 0.2000 | | 1.517 | 64.2 | |
| 15 | | Plano | 0.2563 | | | | |
| 16 | Image plane | Plano | 0.0151 | | | | |

Reference wavelength (d-line) = 587.5 nm

As for the parameters of the aspheric surfaces of the first embodiment, reference is made to Table 2.

TABLE 2

Aspheric Coefficients

| Surface # | 1 | 2 | 4 | 5 | 6 | 7 |
|---|---|---|---|---|---|---|
| k= | −1.92977E−03 | 6.76819E−04 | −1.48087E−02 | −9.42908E−03 | −2.91344E−03 | −1.25824E−02 |
| A4= | 1.05934E−04 | 1.07039E−03 | −2.20151E−03 | 1.28503E−03 | −7.60139E−04 | 2.23748E−03 |
| A6= | −6.25283E−05 | −2.35638E−04 | 9.92240E−04 | −2.58821E−04 | 1.40480E−04 | 1.22574E−04 |
| A8= | −1.16210E−06 | 3.59820E−05 | −2.06067E−04 | 4.99180E−06 | −5.56820E−05 | −3.42043E−05 |
| A10= | | | | | | |
| A12= | | | | | | |
| A14= | | | | | | |

| Surface # | 8 | 9 | 10 | 11 | 12 | 13 |
|---|---|---|---|---|---|---|
| k= | −2.56929E−03 | −6.96965E−03 | −6.41195E−03 | −2.01907E−02 | −1.86873E−03 | 9.91901E−03 |
| A4= | 4.97268E−04 | −1.21600E−04 | −5.36474E−04 | −4.74909E−04 | 1.28019E−03 | 1.32067E−03 |
| A6= | 2.49337E−04 | 1.61724E−05 | −4.02556E−05 | 3.45850E−04 | −3.39587E−05 | −6.75471E−04 |
| A8= | −3.33577E−05 | −3.93832E−06 | 1.54534E−05 | −3.21501E−05 | 6.55577E−06 | 8.73598E−05 |
| A10= | | | −2.21906E−07 | 2.37380E−06 | −9.16956E−07 | −4.93107E−06 |
| A12= | | | −3.86881E−08 | −1.04159E−07 | 2.98564E−08 | 1.02536E−07 |
| A14= | | | | | | |

Table 1 is the detailed structure data to the first embodiment in FIG. 1A, the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, k is the conic coefficient in the aspheric surface formula, and A1-A14 are the first through fourteen order aspheric surface coefficients, respectively. Besides, the tables in following embodiments are referenced to the schematic view and the aberration graphs, respectively, and definitions of parameters in the tables are equal to those in the Table 1 and the Table 2, so the repetitious details need not be given here.

The Second Embodiment

Embodiment 2

Figure 2A:
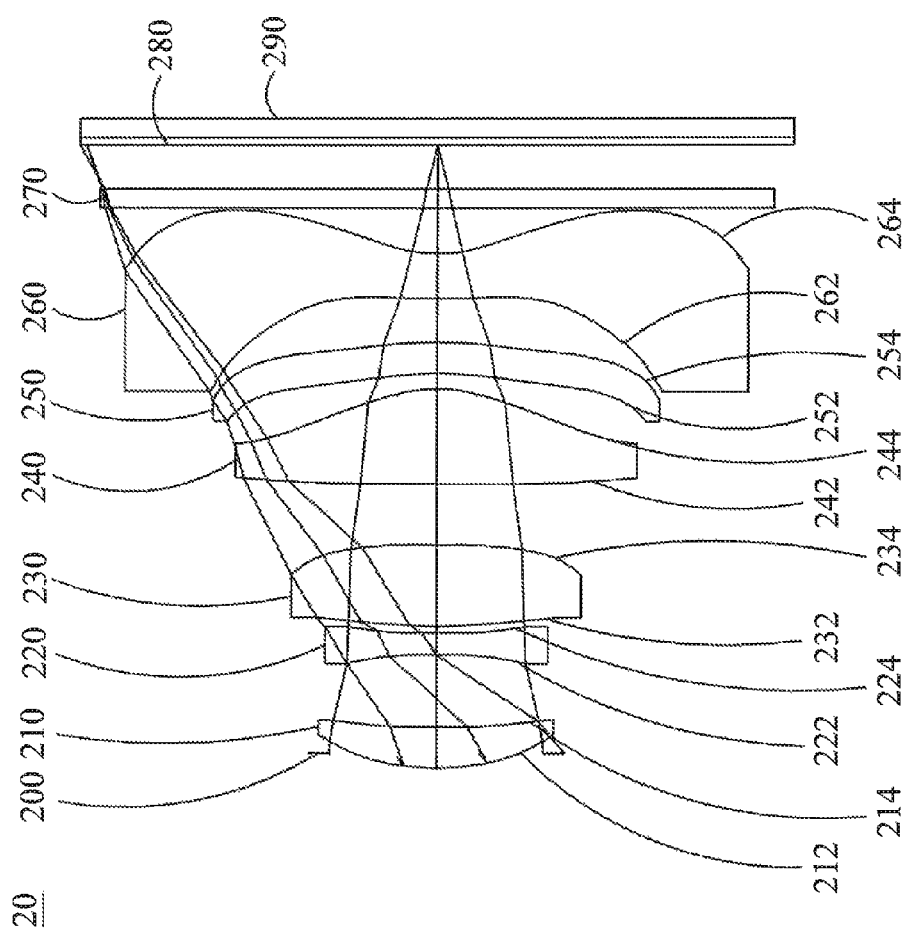
FIG. 2A is a schematic view of the optical image capturing system according to the second embodiment of the present application.
Figure 2B:
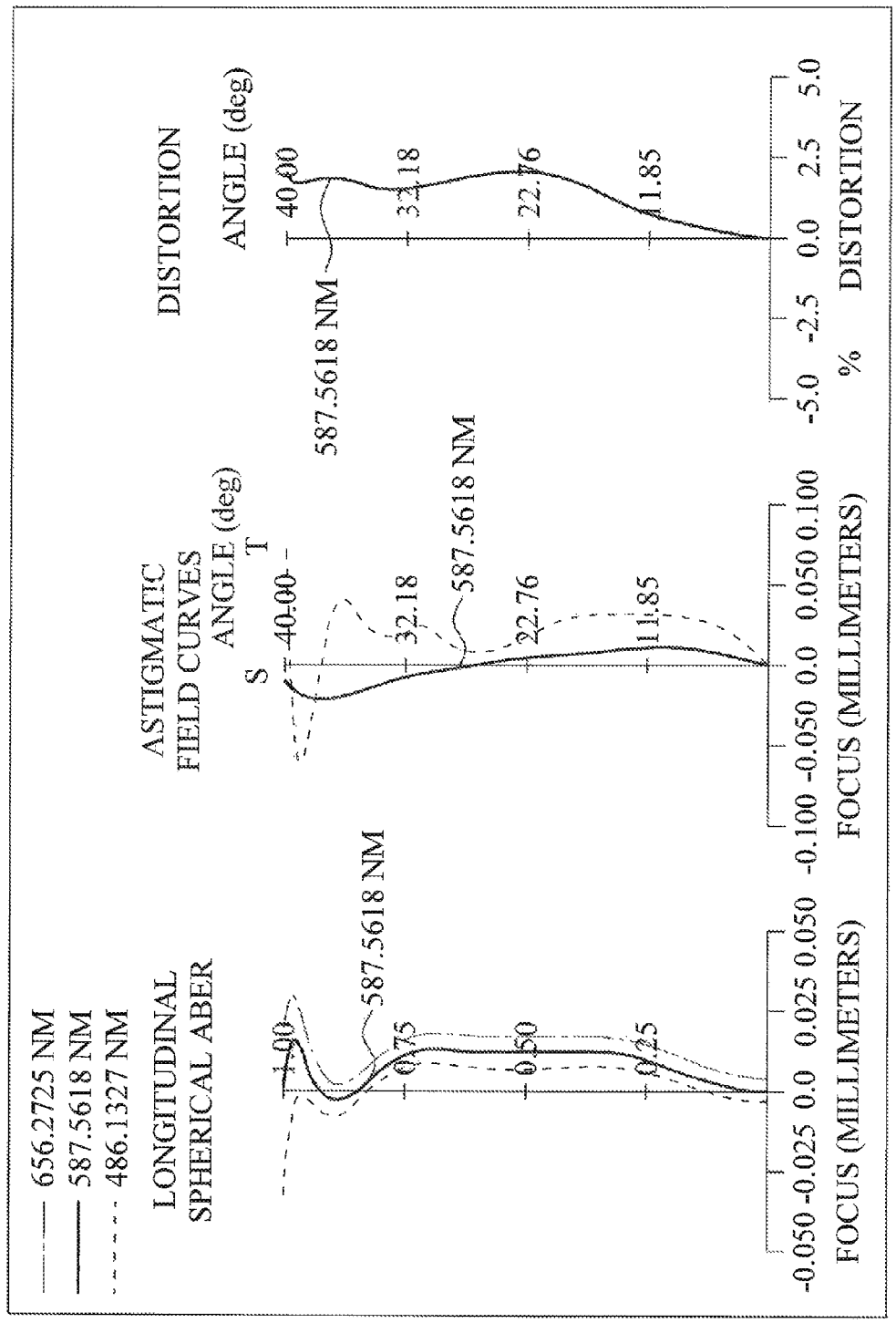
FIG. 2B is longitudinal spherical aberration curves, astigmatic field curves, and an optical distortion grid of the optical image capturing system in the order from left to right according to the second embodiment of the present application.
Figure 2C:
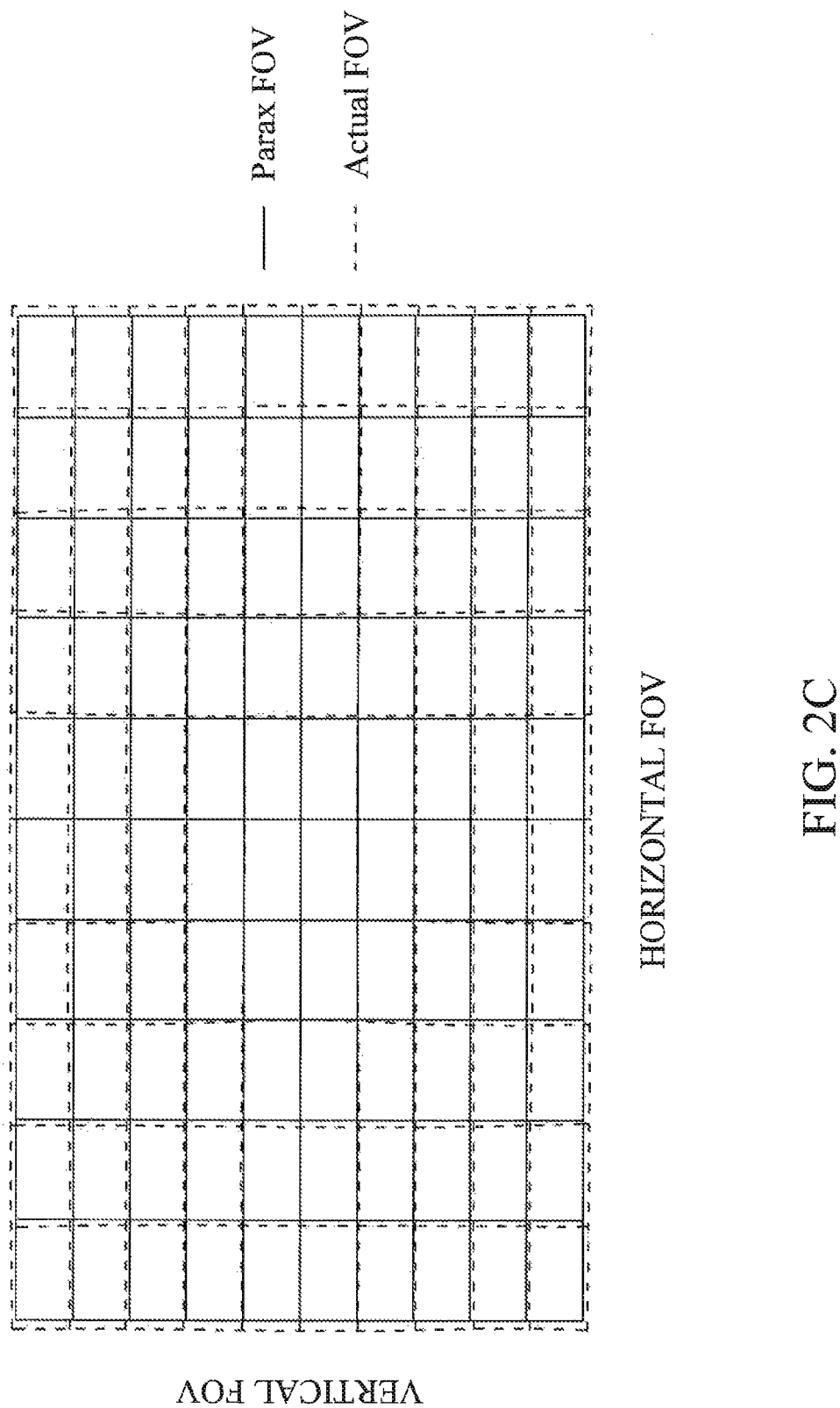
FIG. 2C is a TV distortion grid of the optical image capturing system according to the second embodiment of the present application.

Please refer to FIG. 2A, FIG. 2B, and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a TV distortion grid of the optical image capturing system according to the second embodiment of the present application. As shown in FIG. 2A, in order from an object side to an image side, the optical image capturing system includes a aperture stop 200 first lens element 210, a second lens element 220, a third lens element 230, a fourth lens element 240, a fifth lens element 250, a sixth lens element 260, an IR-bandstop filter 270, an image plane 280, and an image sensing device 290.

The first lens element 210 has a positive refractive power and it is made of plastic material. The first lens element 210 has a convex object-side surface 212 and a concave image-side surface 214, and both of the object-side surface 212 and the image-side surface 214 are aspheric.

The second lens element 220 has a negative refractive power and it is made of plastic material. The second lens element 220 has a concave object-side surface 222 and a concave image-side surface 224, and both of the object-side surface 222 and the image-side surface 224 are aspheric.

The third lens element 230 has a positive refractive power and it is made of plastic material. The third lens element 230 has a convex object-side surface 232 and a convex image-side surface 234, and both of the object-side surface 232 and the image-side surface 234 are aspheric.

The fourth lens element 240 has a positive refractive power and it is made of plastic material. The fourth lens element 240 has a convex object-side surface 242 and a convex image-side surface 244, and both of the object-side surface 242 and the image-side surface 244 are aspheric.

The fifth lens element 250 has a negative refractive power and it is made of plastic material. The fifth lens element 250 has a concave object-side surface 252 and a convex image-side surface 254, and both of the object-side surface 252 and the image-side surface 254 are aspheric.

The sixth lens element 260 has a negative refractive power and it is made of plastic material. The fifth lens element 260 has a convex object-side surface 262 and a concave image-side surface 264, both of the object-side surface 262 and the image-side surface 264 are aspheric, and the image-side surface 264 has inflection points.

The IR-bandstop filter 270 is made of glass material without affecting the focal length of the optical image capturing system and it is disposed between the sixth lens element 260 and the image plane 280.

In the second embodiment of the optical image capturing system, focal lengths of the second lens element 220, the third lens element 230, the fourth lens element 240, and the fifth lens element 250 are f2, f3, f4, and f5, respectively. The following relation is satisfied: |f2|+|f3|+|f4|+|f5|=114.9251 mm, |f1|+|f6|=9.3636 mm, and |f2|+|f3|+|f4|+|f5|>|f1|+|f6|.

In the second embodiment of the optical image capturing system, a central thickness of the fifth lens element 250 is TP5 and a central thickness of the sixth lens element 260 is TP6. The following relation is satisfied: TP5=0.3284 mm and TP6=0.482 mm.

In the second embodiment of the optical image capturing system, the first lens element 210, the third lens element 230, and the fourth lens element 240 are convex lens elements, and focal lengths of the first lens element 210, the third lens element 230, and the fourth lens element 240 are f1, f3, and f4, respectively. A sum of focal lengths of all lens elements with positive refractive powers is ΣPP. The following relation is satisfied: ΣPP=f1+f3+f4=16.0322 mm and f1/(f1+f3+f4)=0.3901. Hereby, it's favorable for allocating the positive refractive power of the first lens element 210 to others convex lens elements and the significant aberrations generated in the process of moving the incident light can be suppressed.

In the second embodiment of the optical image capturing system, focal lengths of the second lens element 220, the fifth lens element 250, and the sixth lens element 260 are f2, f5, and f6, respectively. A sum of focal lengths of all lens elements with negative refractive powers is ΣNP. The following relation is satisfied: ΣNP=f2+f5+f6=−108.2565 mm and f6/(f2+f5+f6)=0.0287. Hereby, it's favorable for allocating the negative refractive power of the sixth lens element to others concave lens elements.

Please refer to the following Table 3 and Table 4.

The detailed data of the optical image capturing system of the second embodiment is as shown in Table 3.

TABLE 3

Data of the optical image capturing system
f = 4.568 mm; f/HEP = 1.6; HAF = 40 deg; tan(HAF) = 0.8390

| Surface # | | Curvature Radius | Thickness | Material | Index | Abbe # | Focal length |
|---|---|---|---|---|---|---|---|
| 0 | Object | Plano | (INFINITY) | | | | |
| 1 | Ape. stop | Plano | −0.1609 | | | | |
| 2 | Lens 1 | 2.7354 | 0.4371 | Plastic | 1.565 | 58 | 6.2546 |
| 3 | | 11.4074 | 0.7814 | | | | |
| 4 | Lens 2 | −5.5614 | 0.2300 | Plastic | 1.607 | 26.6 | −5.148 |
| 5 | | 7.2440 | 0.0651 | | | | |
| 6 | Lens 3 | 4.7898 | 0.8666 | Plastic | 1.565 | 58 | 6.4098 |

TABLE 3-continued

Data of the optical image capturing system
f = 4.568 mm; f/HEP = 1.6; HAF = 40 deg; tan(HAF) = 0.8390

| Surface # | | Curvature Radius | Thickness | Material | Index | Abbe # | Focal length |
|---|---|---|---|---|---|---|---|
| 7 | | −33.8783 | 0.6534 | | | | |
| 8 | Lens 4 | 24.2382 | 1.0066 | Plastic | 1.565 | 58 | 3.3678 |
| 9 | | −2.0339 | 0.1831 | | | | |
| 10 | Lens 5 | −4.0435 | 0.3284 | Plastic | 1.583 | 30.2 | −99.9995 |
| 11 | | −4.4749 | 0.4727 | | | | |
| 12 | Lens 6 | 8.4938 | 0.4820 | Plastic | 1.55 | 56.5 | −3.109 |
| 13 | | 1.3947 | 0.5000 | | | | |
| 14 | IR-bandstop filter | Plano | 0.2000 | | 1.517 | 64.2 | |
| 15 | | Plano | 0.4532 | | | | |
| 16 | Image plane | Plano | 0.0088 | | | | |

Reference wavelength (d-line) = 587.5 nm

As for the parameters of the aspheric surfaces of the second embodiment, reference is made to Table 4.

TABLE 4

Aspheric Coefficients

| Surface # | 2 | 3 | 4 | 5 | 6 | 7 |
|---|---|---|---|---|---|---|
| k= | 0.066829 | 4.042272 | 15.717211 | −28.792406 | −41.261182 | 49.698615 |
| A4= | 8.91349E−03 | 9.45210E−03 | 2.28529E−02 | −9.03157E−04 | −1.47860E−02 | −2.70908E−02 |
| A6= | 3.65285E−03 | −1.40650E−03 | −2.96820E−02 | 3.19060E−03 | 3.58953E−03 | −2.62741E−03 |
| A8= | 1.36305E−04 | 3.37852E−03 | 1.07594E−02 | −3.45561E−03 | −3.45406E−04 | −6.82744E−06 |
| A10= | 5.01286E−04 | −1.75027E−03 | −4.12382E−03 | 4.50539E−04 | −2.64829E−04 | −2.33565E−05 |
| A12= | | | | | | |
| A14= | | | | | | |

| Surface # | 8 | 9 | 10 | 11 | 12 | 13 |
|---|---|---|---|---|---|---|
| k= | 44.783885 | −0.977353 | 1.889603 | −49.649505 | −41.060007 | −4.404653 |
| A4= | −7.07905E−03 | 2.16615E−02 | 3.32640E−02 | 8.24129E−03 | −6.36307E−02 | −3.12209E−02 |
| A6= | 1.35275E−03 | 2.06260E−03 | −1.74381E−02 | −2.37496E−03 | 7.07006E−03 | 5.01237E−03 |
| A8= | 2.26809E−04 | 1.47393E−06 | −9.71708E−05 | −6.15689E−05 | −4.91985E−04 | −5.07820E−04 |
| A10= | −5.78568E−05 | −4.94637E−05 | −7.53942E−05 | 8.67077E−06 | 6.33732E−05 | 1.56377E−05 |
| A12= | | | −3.00632E−06 | −1.94404E−06 | 5.31590E−06 | 1.23592E−06 |
| A14= | | | 1.95335E−06 | −4.38371E−07 | −2.27119E−06 | −8.85736E−08 |

In the second embodiment, the presentation of the aspheric surface formula is similar to that in the first embodiment. Besides, the definitions of parameters in following tables are equal to those in the first embodiment, so the repetitious details need not be given here.

The following content may be deduced from Table 3 and Table 4.

| Second embodiment | | | |
|---|---|---|---|
| $|f/f1|$ | 0.7303 | InRS51 | −0.6609 |
| f1/ΣPP | 0.3901 | InRS52 | −0.7865 |
| f6/ΣNP | 0.0287 | InRS61 | −1.1992 |
| IN12/f | 0.1711 | InRS62 | −0.4736 |
| HOS/f | 1.4598 | Inf61 | 0.0128 |
| ΣPPR | 2.7994 | HVT61 | 0.6678 |
| |ΣNPR| | 2.4023 | Inf62 | 0.4629 |
| ΣPPR/|ΣNPR| | 1.1653 | HVT62 | 2.1152 |
| (R11 − R12)/(R11 + R12) | 0.7179 | |InRS52|/TP5 | 2.3949 |
| HOS | 6.6685 | |InRS52| + |InRS61| | 1.9857 |
| HOS/HOI | 1.7042 | |InRS62|/TP6 | 0.9826 |
| InS/HOS | 0.9759 | Inf62/|InRS62| | 4.4662 |
| InTL/HOS | 0.8257 | HVT62/HOI | 0.5406 |

-continued

| Second embodiment | | | |
|---|---|---|---|
| ΣTP/InTL | 0.6085 | HVT62/HOS | 0.3172 |
| (TP1 + IN12)/TP2 | 5.2978 | HVT62/(Inf62 + CT6) | 2.2385 |
| (TP6 + IN56)/TP5 | 2.9071 | |TDT| | 0.45 |
| (TP2 + TP3 + TP4)/ΣTP | 0.4749 | |ODT| | 2.0559 |

The Third Embodiment

Embodiment 3

Figure 3A:
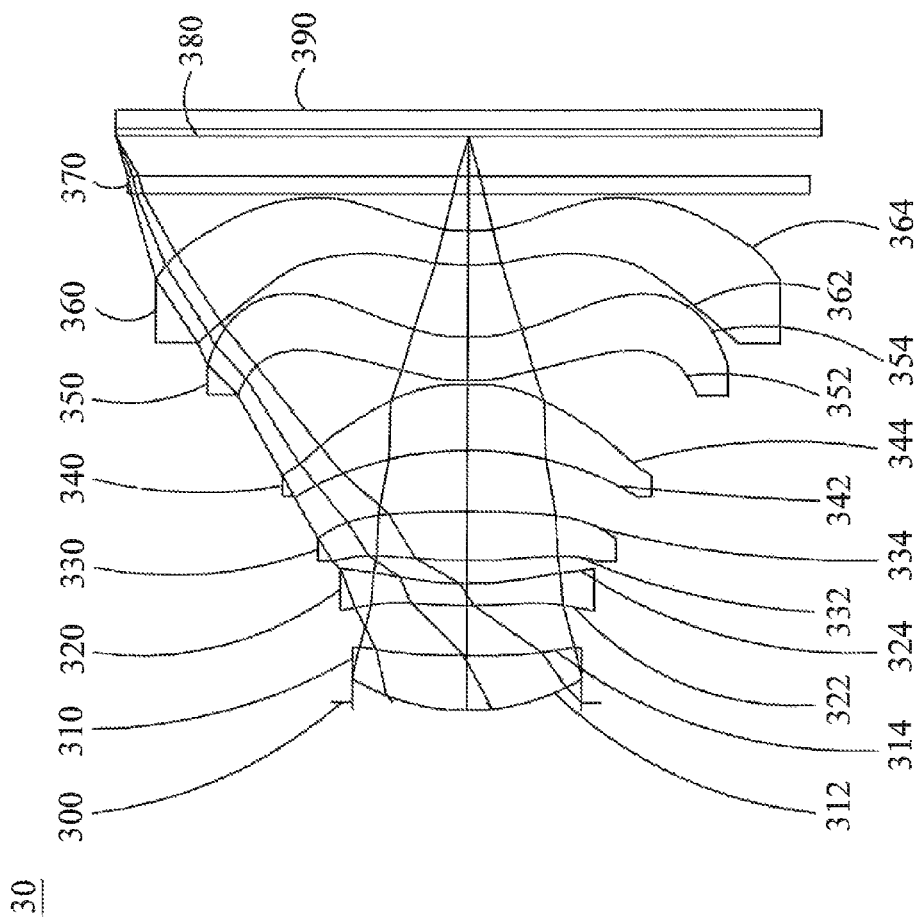
FIG. 3A is a schematic view of the optical image capturing system according to the third embodiment of the present application.
Figure 3B:
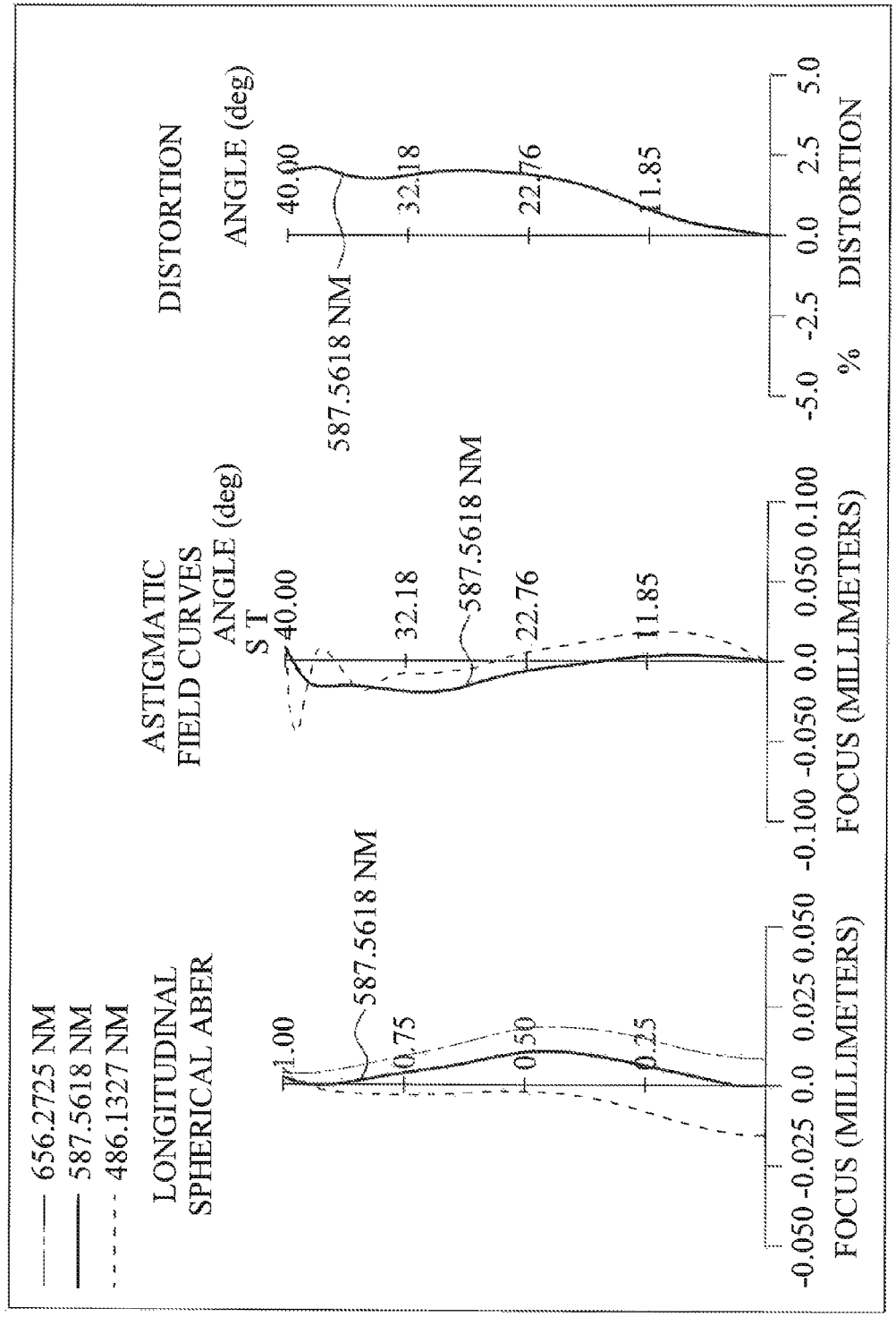
FIG. 3B is longitudinal spherical aberration curves, astigmatic field curves, and an optical distortion grid of the optical image capturing system in the order from left to right according to the third embodiment of the present application.
Figure 3C:
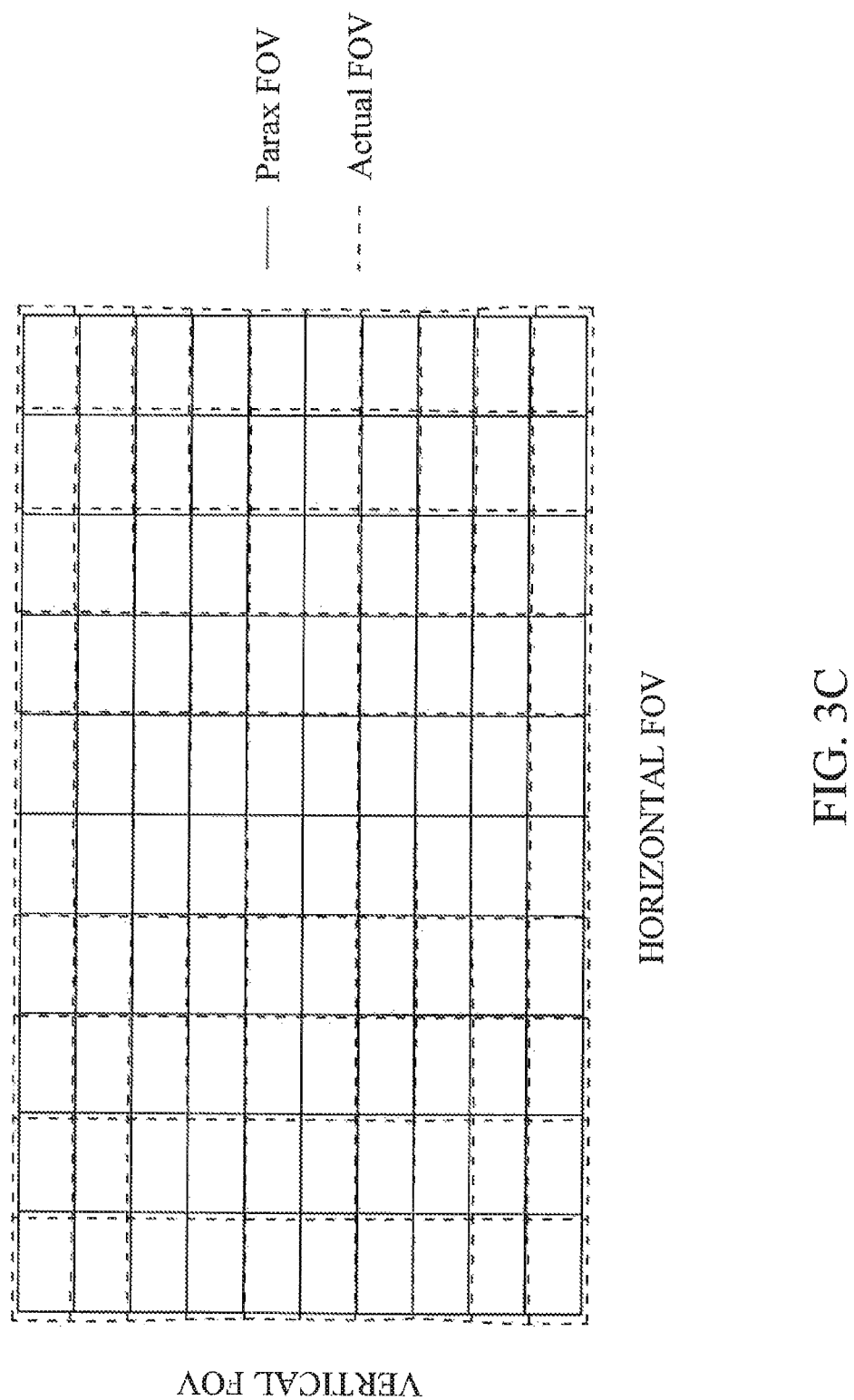
FIG. 3C is a TV distortion grid of the optical image capturing system according to the third embodiment of the present application.

Please refer to FIG. 3A, FIG. 3B, and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a TV distortion grid of the optical image capturing system according to the third embodiment of the present application. As shown in FIG. 3A, in order from an object side to an image side, the optical image capturing system includes a aperture stop 300, first lens element 310, a second lens element 320, a third lens element 330, a fourth lens element 340, a fifth lens element 350, a sixth lens element 360, an IR-bandstop filter 370, an image plane 380, and an image sensing device 390.

The first lens element 310 has a positive refractive power and it is made of plastic material. The first lens element 310 has a convex object-side surface 312 and a concave image-side surface 314, and both of the object-side surface 312 and the image-side surface 314 are aspheric.

The second lens element 320 has a negative refractive power and it is made of plastic material. The second lens element 320 has a convex object-side surface 322 and a concave image-side surface 324, and both of the object-side surface 322 and the image-side surface 324 are aspheric.

The third lens element 330 has a positive refractive power and it is made of plastic material. The third lens element 330 has a convex object-side surface 332 and a convex image-side surface 334, and both of the object-side surface 332 and the image-side surface 334 are aspheric.

The fourth lens element 340 has a positive refractive power and it is made of plastic material. The fourth lens element 340 has a concave object-side surface 342 and a convex image-side surface 344, and both of the object-side surface 342 and the image-side surface 344 are aspheric.

The fifth lens element 350 has a negative refractive power and it is made of plastic material. The fifth lens element 350 has a convex object-side surface 352 and a concave image-side surface 354, both of the object-side surface 352 and the image-side surface 354 are aspheric, and each of the object-side surface 352 and the image-side surface 354 has inflection points.

The sixth lens element 360 has a negative refractive power and it is made of plastic material. The sixth lens element 360 has a convex object-side surface 362 and a concave image-side surface 364, both of the object-side surface 362 and the image-side surface 364 are aspheric, and each of the object-side surface 362 and the image-side surface 364 has inflection points.

The IR-bandstop filter 370 is made of glass material without affecting the focal length of the optical image capturing system and it is disposed between the sixth lens element 360 and the image plane 380.

In the third embodiment of the optical image capturing system, focal lengths of the second lens element 320, the third lens element 330, the fourth lens element 340, and the fifth lens element 350 are f2, f3, f4, and f5, respectively. The following relation is satisfied: $|f2|+|f3|+|f4|+|f5|=41.3676$ mm, $|f1|+|f6|=15.4102$ mm, and $|f2|+|f3|+|f4|+|f5|>|f1|+|f6|$.

In the second embodiment of the optical image capturing system, a central thickness of the fifth lens element 350 is TP5 and a central thickness of the sixth lens element 360 is TP6. The following relation is satisfied: TP5=0.4643 mm and TP6=0.397 mm.

In the third embodiment of the optical image capturing system, the first lens element 310, the third lens element 330, and the fourth lens element 340 are convex lens elements, and focal lengths of the first lens element 310, the third lens element 330, and the fourth lens element 340 are f1, f3, and f4, respectively. A sum of focal lengths of all lens elements with positive refractive powers is ΣPP. The following relation is satisfied: $\Sigma PP=f1+f3+f4=22.3150$ mm and $f1/(f1+f3+f4)=0.2944$. Hereby, it's favorable for allocating the positive refractive power of the first lens element 310 to others convex lens elements and the significant aberrations generated in the process of moving the incident light can be suppressed.

In the third embodiment of the optical image capturing system, focal lengths of the second lens element 320, the fifth lens element 350, and the sixth lens element 360 are f2, f5, and f6, respectively. A sum of focal lengths of all lens elements with negative refractive powers is ΣNP. The following relation is satisfied: $\Sigma NP=f2+f5+f6=-34.4628$ mm and $f6/(f2+f5+f6)=0.2565$. Hereby, it's favorable for allocating the negative refractive power of the sixth lens element to others concave lens elements.

In the third embodiment of the optical image capturing system, a distance perpendicular to the optical axis between a critical point on the object-side surface 352 of the fifth lens element and the optical axis is HVT5. A distance perpendicular to the optical axis between a critical point on the image-side surface 354 of the fifth lens element and the optical axis is HVT52. The following relation is satisfied: HVT51=1.8222 mm and HVT52=1.9807 mm. A distance in parallel with an optical axis from an inflection point to an axial point on the object-side surface 352 of the fifth lens element is Inf51. A distance in parallel with an optical axis from an inflection point to an axial point on the image-side surface 354 of the fifth lens element is Inf52. The following relation is satisfied: Inf51=0.3233 mm and Inf52=0.4878 mm.

Please refer to the following Table 5 and Table 6.

The detailed data of the optical image capturing system of the third embodiment is as shown in Table 5.

TABLE 5

Data of the optical image capturing system
f = 4.5708 mm; f/HEP = 1.8; HAF = 40 deg; tan(HAF) = 0.8390

| Surface# | | Curvature Radius | Thickness | Material | Index | Abbe # | Focal length |
|---|---|---|---|---|---|---|---|
| 0 | Object | Plano | (INFINITY) | | | | |
| 1 | Ape. stop | Plano | −0.0849 | | | | |
| 2 | Lens 1 | 2.5793 | 0.6055 | Plastic | 1.565 | 58 | 6.5704 |
| 3 | | 7.7349 | 0.5564 | | | | |
| 4 | Lens 2 | 5.5563 | 0.2534 | Plastic | 1.65 | 21.4 | −9.6138 |
| 5 | | 2.8883 | 0.2687 | | | | |
| 6 | Lens 3 | 7.7287 | 0.5371 | Plastic | 1.565 | 58 | 10.2886 |
| 7 | | −22.8650 | 0.6799 | | | | |
| 8 | Lens 4 | −4.6625 | 0.7430 | Plastic | 1.565 | 58 | 5.456 |
| 9 | | −1.9625 | 0.0500 | | | | |
| 10 | Lens 5 | 2.4146 | 0.4643 | Plastic | 1.583 | 30.2 | −16.0092 |
| 11 | | 1.7825 | 0.7991 | | | | |
| 12 | Lens 6 | 2.0782 | 0.3970 | Plastic | 1.565 | 54.5 | −8.8398 |
| 13 | | 1.3663 | 0.4000 | | | | |

TABLE 5-continued

Data of the optical image capturing system
f = 4.5708 mm; f/HEP = 1.8; HAF = 40 deg; tan(HAF) = 0.8390

| Surface# | Curvature Radius | Thickness | Material | Index | Abbe # | Focal length |
|---|---|---|---|---|---|---|
| 14 | IR-bandstop filter | Plano | 0.2000 | | 1.517 | 64.2 | |
| 15 | | Plano | 0.4431 | | | | |
| 16 | Image plane | Plano | 0.0024 | | | | |

Reference wavelength (d-line) = 587.5 nm

As for the parameters of the aspheric surfaces of the third embodiment, reference is made to Table 6.

TABLE 6

Aspheric Coefficients

| Surface # | 2 | 3 | 4 | 5 | 6 | 7 |
|---|---|---|---|---|---|---|
| k= | −0.196533 | −50 | −19.775218 | 1.561681 | −0.645552 | −10.087519 |
| A4= | 4.02643E−03 | 1.01346E−02 | −7.12842E−02 | −9.42867E−02 | −2.59920E−02 | −2.49073E−02 |
| A6= | 2.33677E−03 | −2.97144E−03 | 1.97598E−02 | 2.90022E−02 | 1.15767E−03 | −2.65177E−05 |
| A8= | −4.08952E−04 | 9.68127E−04 | −6.82133E−03 | −8.97945E−03 | −3.03955E−04 | 3.59591E−04 |
| A10= | 2.39995E−04 | −3.26728E−04 | 7.49214E−04 | 1.02910E−03 | −6.12846E−04 | −4.70556E−04 |
| A12= | | | | | | |
| A14= | | | | | | |

| Surface # | 8 | 9 | 10 | 11 | 12 | 13 |
|---|---|---|---|---|---|---|
| k= | −12.651135 | −1.071704 | −1.802359 | −2.574175 | −11.604089 | −5.450052 |
| A4= | −2.97957E−02 | −5.02971E−03 | −3.21911E−02 | −2.24849E−02 | −4.55339E−02 | −2.71208E−02 |
| A6= | 1.62635E−03 | −1.65609E−04 | 1.88532E−03 | 6.07302E−04 | 3.49582E−03 | 1.10653E−03 |
| A8= | 5.92979E−04 | −3.52584E−04 | 1.42533E−04 | −3.45323E−05 | −3.18085E−05 | 4.77116E−05 |
| A10= | −1.40451E−05 | 1.88628E−04 | −1.61380E−04 | −6.02912E−06 | −2.61111E−05 | −1.01928E−06 |
| A12= | | 3.59732E−05 | 5.93457E−07 | 4.84160E−06 | −1.08511E−07 | |
| A14= | | −3.20303E−06 | −1.15153E−07 | −2.68869E−07 | −9.42930E−09 | |

In the third embodiment the presentation of the aspheric surface formula is similar to that in the first embodiment. Besides the definitions of parameters in following tables are equal to those in the first embodiment so the repetitious details need not be given here.

The following content may be deduced from Table 5 and Table 6.

Third embodiment

| |f/f1| | 0.6957 | InRS51 | −0.2018 |
|---|---|---|---|
| f1/ΣPP | 0.2944 | InRS52 | −0.3277 |
| f6/ΣNP | 0.2565 | InRS61 | −0.8791 |
| IN12/f | 0.1217 | InRS62 | −0.5854 |
| HOS/f | 1.4002 | Inf61 | 0.1372 |
| ΣPPR | 1.9777 | HVT61 | 1.2092 |
| |ΣNPR| | 1.2780 | Inf62 | 0.3589 |
| ΣPPR/|ΣNPR| | 1.5475 | HVT62 | 1.7312 |
| (R11 − R12)/(R11 + R12) | 0.2067 | |InRS52|/TP5 | 0.7058 |
| HOS | 6.6685 | |InRS52| + |InRS61| | 1.2068 |
| HOS/HOI | 1.6356 | |InRS62|/TP6 | 1.4746 |
| InS/HOS | 0.9867 | Inf62/|InRS62| | 0.2073 |
| InTL/HOS | 0.8366 | HVT62/HOI | 0.4424 |
| ΣTP/InTL | 0.5603 | HVT62/HOS | 0.2705 |
| (TP1 + IN12)/TP2 | 4.5852 | HVT62/(Inf62 + CT6) | 2.2903 |
| (TP6 + IN56)/TP5 | 2.5761 | |TDT| | 0.24 |
| (TP2 + TP3 + TP4)/ΣTP | 0.6529 | |ODT| | 2.0659 |

The Fourth Embodiment

Embodiment 4

Figure 4A:
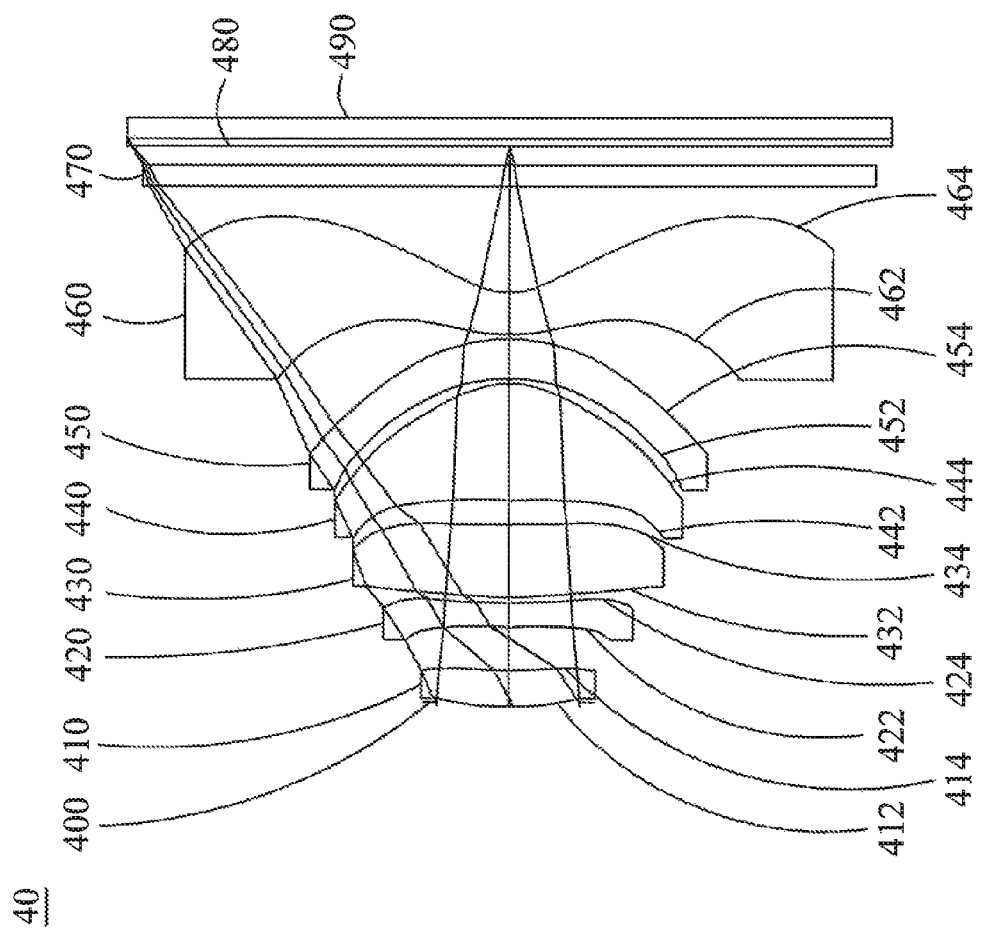
FIG. 4A is a schematic view of the optical image capturing system according to the fourth embodiment of the present application.
Figure 4B:
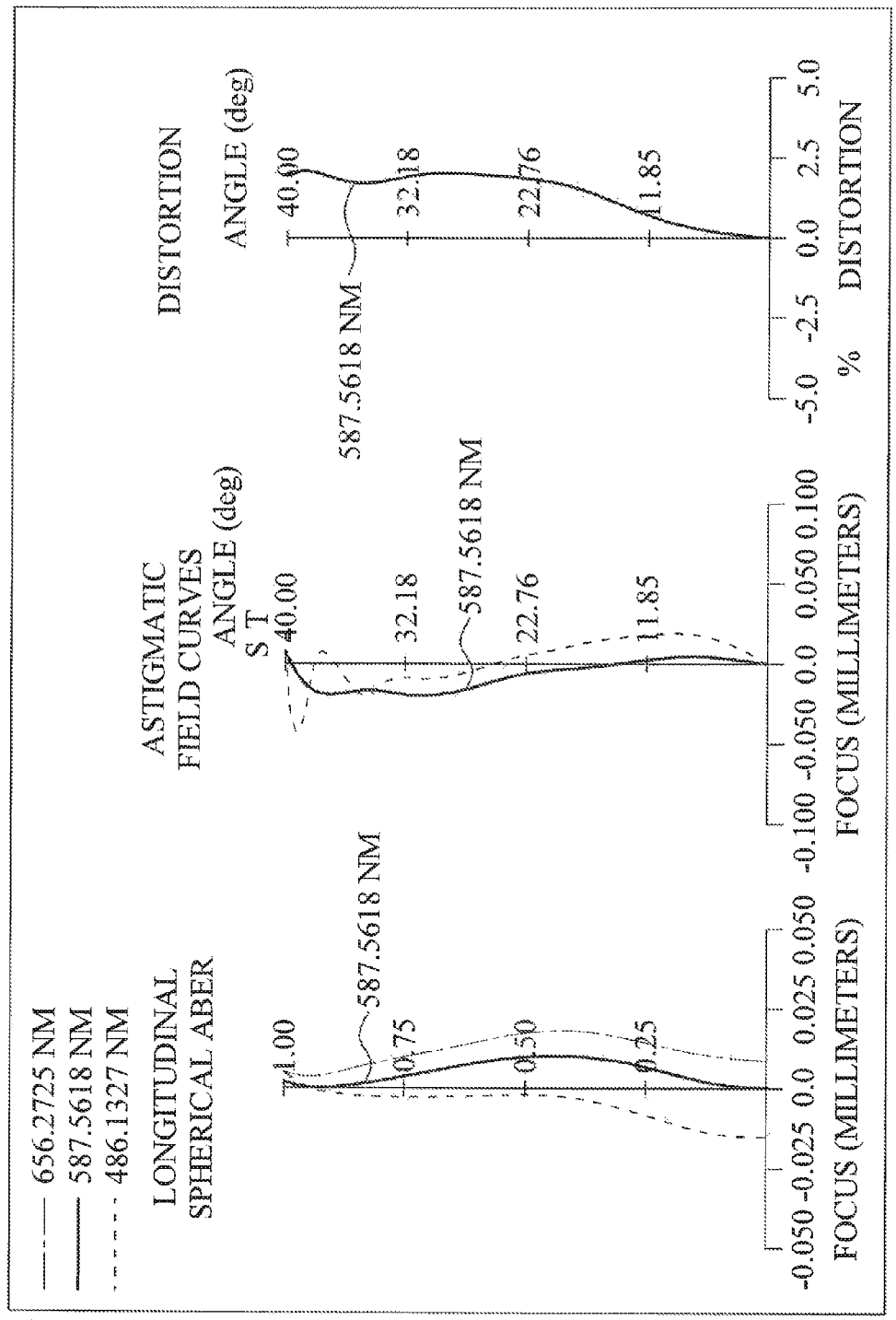
FIG. 4B is longitudinal spherical aberration curves, astigmatic field curves, and an optical distortion grid of the optical image capturing system in the order from left to right according to the fourth embodiment of the present application.
Figure 4C:
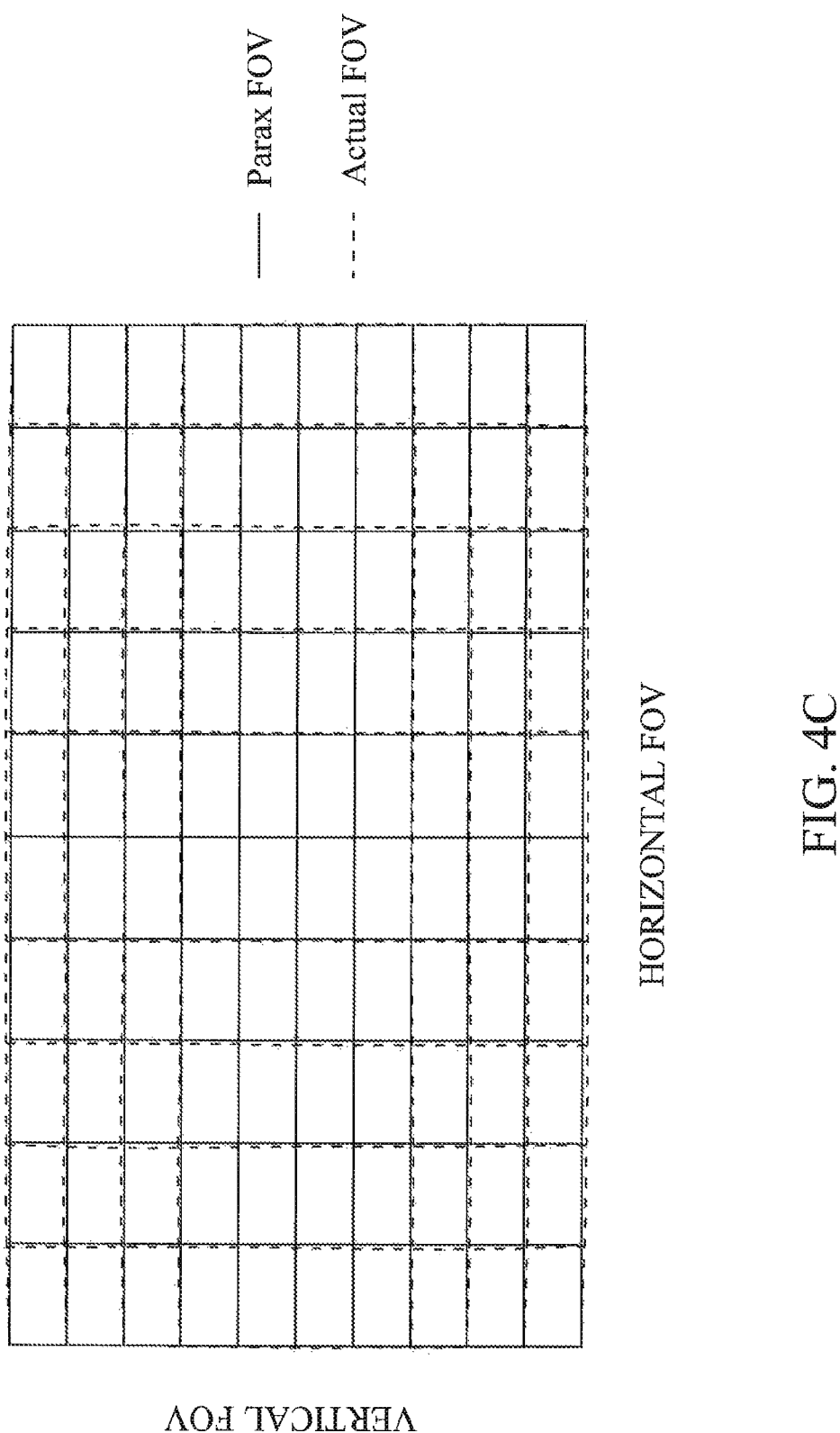
FIG. 4C is a TV distortion grid of the optical image capturing system according to the fourth embodiment of the present application.

Please refer to FIG. 4A, FIG. 4B, and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a TV distortion grid of the optical image capturing system according to the fourth embodiment of the present application. As shown in FIG. 4A, in order from an object side to an image side, the optical image capturing system includes a aperture stop 400, first lens element 410, a second lens element 420, a third lens element 430, a fourth lens element 440, a fifth lens element 450, a sixth lens element 460, an IR-bandstop filter 470, an image plane 480, and an image sensing device 490.

The first lens element 410 has a positive refractive power and it is made of plastic material. The first lens element 410 has a convex object-side surface 412 and a concave image-side surface 414, and both of the object-side surface 412 and the image-side surface 414 are aspheric.

The second lens element 420 has a negative refractive power and it is made of plastic material. The second lens element 420 has a convex object-side surface 422 and a concave image-side surface 424, and both of the object-side surface 412 and the image-side surface 414 are aspheric.

The third lens element 430 has a positive refractive power and it is made of plastic material. The third lens element 430 has a convex object-side surface 432 and a concave image-side surface 434, and both of the object-side surface 432 and the image-side surface 434 are aspheric.

The fourth lens element 440 has a positive refractive power and it is made of plastic material. The fourth lens element 440 has a concave object-side surface 442 and a convex image-side surface 444, and both of the object-side surface 442 and the image-side surface 444 are aspheric.

The fifth lens element 450 has a negative refractive power and it is made of plastic material. The fifth lens element 450 has a concave object-side surface 452 and a convex image-side surface 454, and both of the object-side surface 452 and the image-side surface 454 are aspheric.

The sixth lens element 460 has a negative refractive power and it is made of plastic material. The sixth lens element 460 has a convex object-side surface 462 and a concave image-side surface 464, both of the object-side surface 462 and the image-side surface 464 are aspheric, and each of the object-side surface 462 and the image-side surface 464 has inflection points.

The IR-bandstop filter 470 is made of glass material without affecting the focal length of the optical image capturing system and it is disposed between the sixth lens element 460 and the image plane 480.

In the fourth embodiment of the optical image capturing system, focal lengths of the second lens element 420, the third lens element 430, the fourth lens element 440, and the fifth lens element 450 are f2, f3, f4, and f5, respectively. The following relation is satisfied: $|f2|+|f3|+|f4|+|f5|=88.2034$ mm, $|f1|+|f6|=8.7640$ mm, and $|f2|+|f3|+|f4|+|f5|>|f1|+|f6|$.

In the fourth embodiment of the optical image capturing system, a central thickness of the fifth lens element 450 is TP5 and a central thickness of the sixth lens element 460 is TP6. The following relation is satisfied: TP5=0.372 mm and TP6=0.392 mm.

In the fourth embodiment of the optical image capturing system, the first lens element 410, the third lens element 430, and the fourth lens element 440 are convex lens elements, and focal lengths of the first lens element 410, the third lens element 430, and the fourth lens element 440 are f1, f3, and f4, respectively. A sum of focal lengths of all lens elements with positive refractive powers is $\Sigma PP$. The following relation is satisfied: $\Sigma PP=f1+f3+f4=19.5427$ mm and $f1/(f1+f3+f4)=0.3362$. Hereby, it's favorable for allocating the positive refractive power of the first lens element 310 to others convex lens elements and the significant aberrations generated in the process of moving the incident light can be suppressed.

In the fourth embodiment of the optical image capturing system, focal lengths of the second lens element 420, the fifth lens element 450, and the sixth lens element 460 are f2, f5, and f6, respectively. A sum of focal lengths of all lens elements with negative refractive powers is $\Sigma NP$. The following relation is satisfied: $\Sigma NP=f2+f5+f6=-77.4247$ mm and $f6/(f2+f5+f6)=0.0283$. Hereby, it's favorable for allocating the negative refractive power of the sixth lens element to others concave lens elements.

Please refer to the following Table 7 and Table 8.

The detailed data of the optical image capturing system of the fourth embodiment is as shown in Table 7.

TABLE 7

Data of the optical image capturing system
f = 3.2261 mm; f/HEP = 2.4; HAF = 50 deg; tan(HAF) = 1.1918

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.0506 | | | | |
| 2 | Lens 1 | 2.7629 | 0.3452 | Plastic | 1.565 | 58 | 6.5693 |
| 3 | | 10.3213 | 0.4103 | | | | |
| 4 | Lens 2 | 18.1280 | 0.2300 | Plastic | 1.65 | 21.4 | −10.0452 |
| 5 | | 4.7764 | 0.0500 | | | | |
| 6 | Lens 3 | 4.2339 | 0.6831 | Plastic | 1.565 | 58 | 11.2632 |
| 7 | | 11.9135 | 0.2425 | | | | |
| 8 | Lens 4 | −9.2544 | 1.0859 | Plastic | 1.565 | 58 | 1.7102 |
| 9 | | −0.9120 | 0.0500 | | | | |
| 10 | Lens 5 | −1.5115 | 0.3720 | Plastic | 1.65 | 21.4 | −65.1848 |
| 11 | | −1.7194 | 0.0500 | | | | |
| 12 | Lens 6 | 1.5141 | 0.3920 | Plastic | 1.583 | 30.2 | −2.1947 |
| 13 | | 0.6274 | 1.0000 | | | | |
| 14 | IR-bandstop filter | Plano | 0.2000 | | 1.517 | 64.2 | |
| 15 | | Plano | 0.1819 | | | | |
| 16 | Image plane | Plano | 0.0369 | | | | |

Reference wavelength (d-line) = 587.5 nm

As for the parameters of the aspheric surfaces of the fourth embodiment, reference is made to Table 8.

TABLE 8

Aspheric Coefficients

| Surface # | 2 | 3 | 4 | 5 | 6 | 7 |
|---|---|---|---|---|---|---|
| k= | 2.578127 | 7.020191 | 50 | −25.742284 | −47.120764 | −24.90664 |
| A4= | −3.76949E−02 | −4.75665E−02 | −7.33704E−02 | −6.76791E−02 | −2.90355E−02 | −2.95349E−02 |
| A6= | −1.67174E−02 | −5.20253E−02 | −9.76000E−02 | 9.24872E−03 | 2.27382E−02 | −1.19767E−02 |

TABLE 8-continued

| Aspheric Coefficients | | | | | |
|---|---|---|---|---|---|
| A8= | −2.78799E−02 | 1.33716E−02 | 6.97754E−02 | −1.97034E−02 | −6.66589E−03 | −2.37353E−03 |
| A10= | −2.50835E−02 | −6.63920E−02 | −7.72699E−02 | 5.09636E−03 | 7.55826E−04 | −4.41275E−04 |
| A12 | | | | | | |
| A14= | | | | | | |

| Surface # | 8 | 9 | 10 | 11 | 12 | 13 |
|---|---|---|---|---|---|---|
| k= | −50 | −2.122558 | −0.481508 | −0.490325 | −17.26998 | −3.348543 |
| A4= | 1.38112E−02 | 3.61266E−02 | 1.49566E−02 | −1.21327E−02 | −5.59544E−02 | −4.19252E−02 |
| A6= | −1.38431E−02 | −3.17102E−02 | 8.28136E−03 | 1.08669E−02 | 8.34136E−03 | 8.09734E−03 |
| A8= | −1.21520E−02 | 3.13942E−03 | −7.80129E−03 | 1.50118E−03 | −1.64227E−03 | −9.76755E−04 |
| A10= | 1.15221E−03 | 1.41402E−04 | 2.45859E−03 | −9.91356E−04 | −4.42214E−04 | 4.21678E−05 |
| A12= | | | 6.60350E−04 | −1.15712E−04 | 2.50790E−04 | 2.02274E−06 |
| A14= | | | −4.28428E−04 | 5.46719E−05 | −2.73237E−05 | −1.93157E−07 |

In the fourth embodiment the presentation of the aspheric surface formula is similar to that in the first embodiment. Besides the definitions of parameters in following tables are equal to those in the first embodiment so the repetitious details need not be given here.

The following content may be deduced from Table 7 and Table 8.

| Fourth embodiment | | | |
|---|---|---|---|
| $|f/f1|$ | 0.4911 | InRS51 | −0.2018 |
| $f1/\Sigma PP$ | 0.3362 | InRS52 | −0.3277 |
| $f6/\Sigma NP$ | 0.0283 | InRS61 | −0.8791 |
| IN12/f | 0.1272 | InRS62 | −0.5854 |
| HOS/f | 1.6521 | Inf61 | 0.1372 |
| $\Sigma PPR$ | 2.6639 | HVT61 | 1.2092 |
| $|\Sigma NPR|$ | 1.8406 | Inf62 | 0.3589 |
| $\Sigma PPR/|\Sigma NPR|$ | 1.4473 | HVT62 | 1.7312 |
| (R11 − R12)/(R11 + R12) | 0.4141 | |InRS52|/TP5 | 3.0508 |
| HOS | 5.3299 | |InRS52| + |InRS61| | 1.7089 |
| HOS/HOI | 1.3621 | |InRS62|/TP6 | 0.2309 |
| InS/HOS | 0.9905 | Inf62/|InRS62| | 7.9470 |
| InTL/HOS | 0.7338 | HVT62/HOI | 0.5557 |
| $\Sigma TP/InTL$ | 0.7947 | HVT62/HOS | 0.4080 |
| (TP1 + IN12)/TP2 | 3.2848 | HVT62/(Inf62 + CT6) | 1.9570 |
| (TP6 + IN56)/TP5 | 1.1882 | |TDT| | 0.85 |
| (TP2 + TP3 + TP4)/$\Sigma TP$ | 0.7743 | |ODT| | 2.3078 |

The Fifth Embodiment

Embodiment 5

Figure 5A:
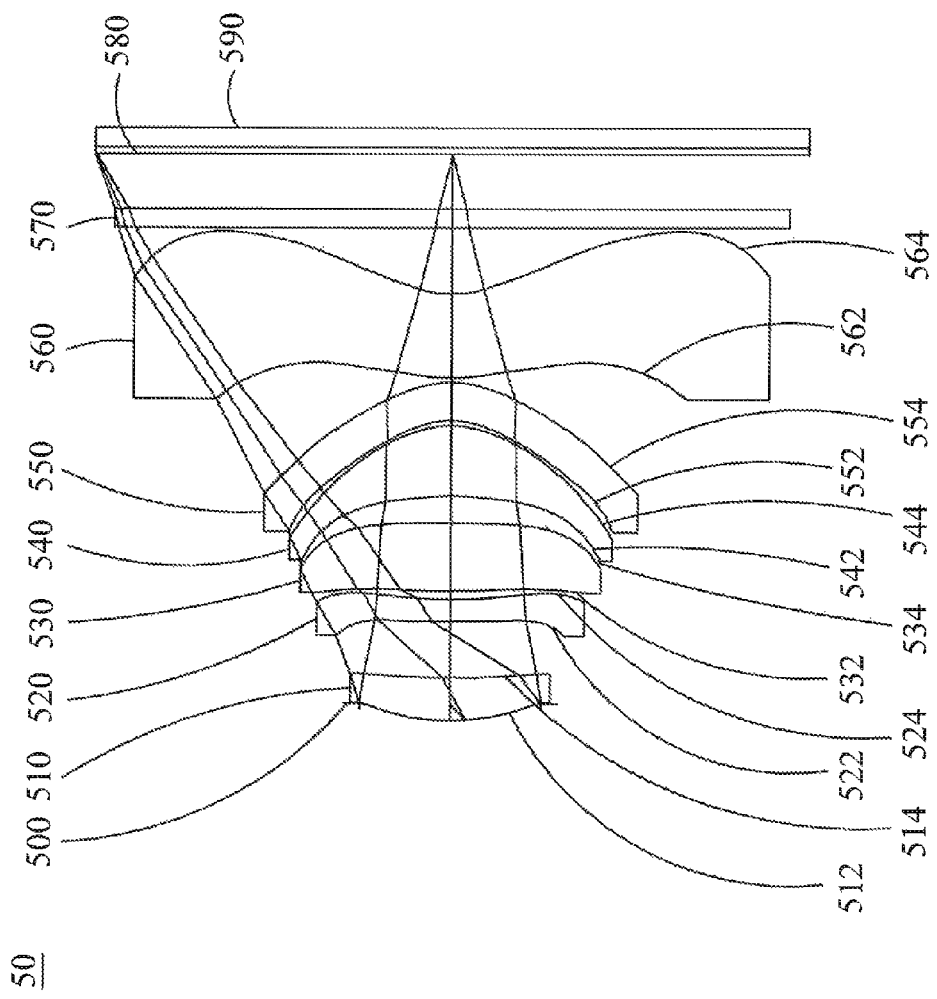
FIG. 5A is a schematic view of the optical image capturing system according to the fifth embodiment of the present application.
Figure 5B:
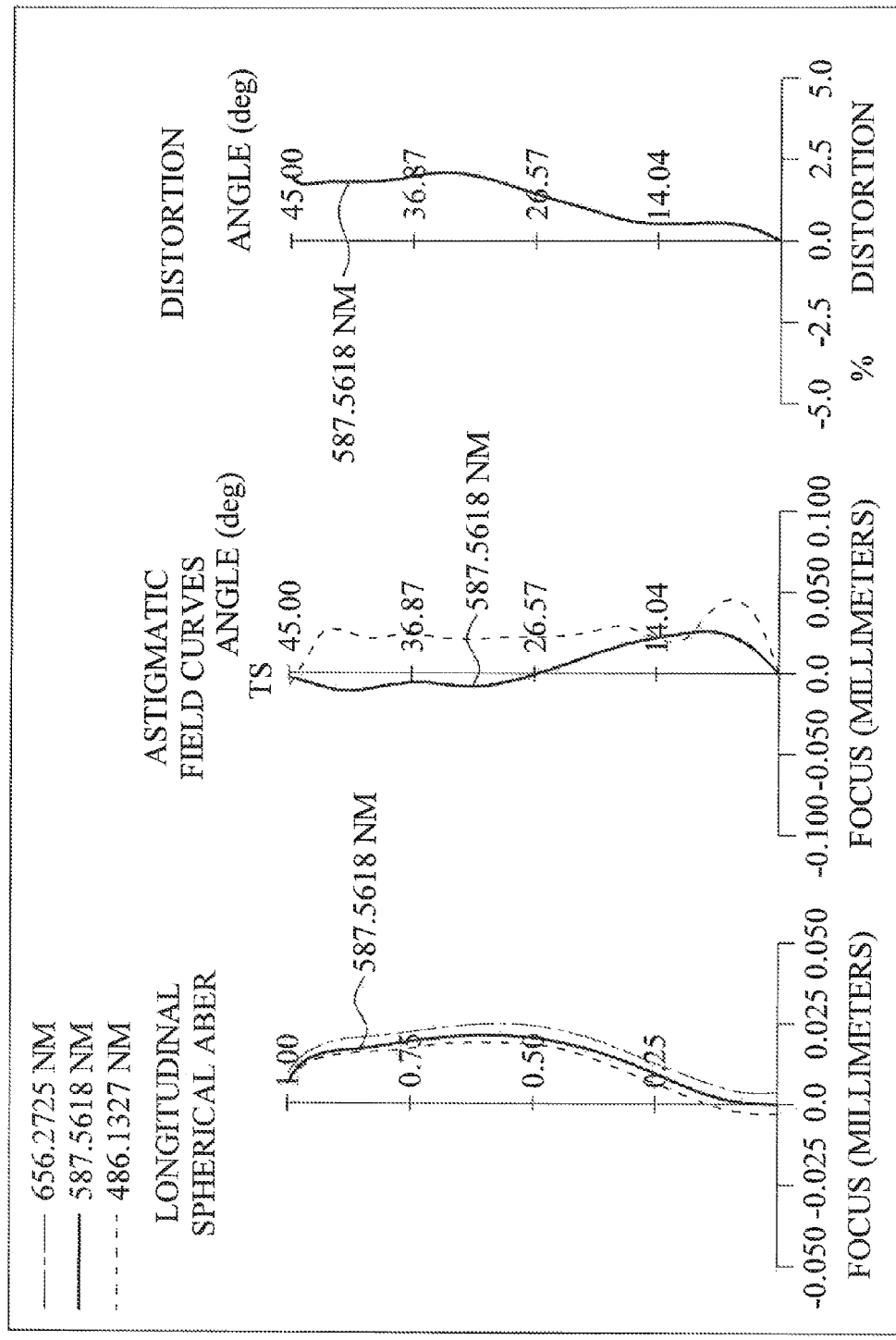
FIG. 5B is longitudinal spherical aberration curves, astigmatic field curves, and an optical distortion grid of the optical image capturing system in the order from left to right according to the fifth embodiment of the present application.
Figure 5C:
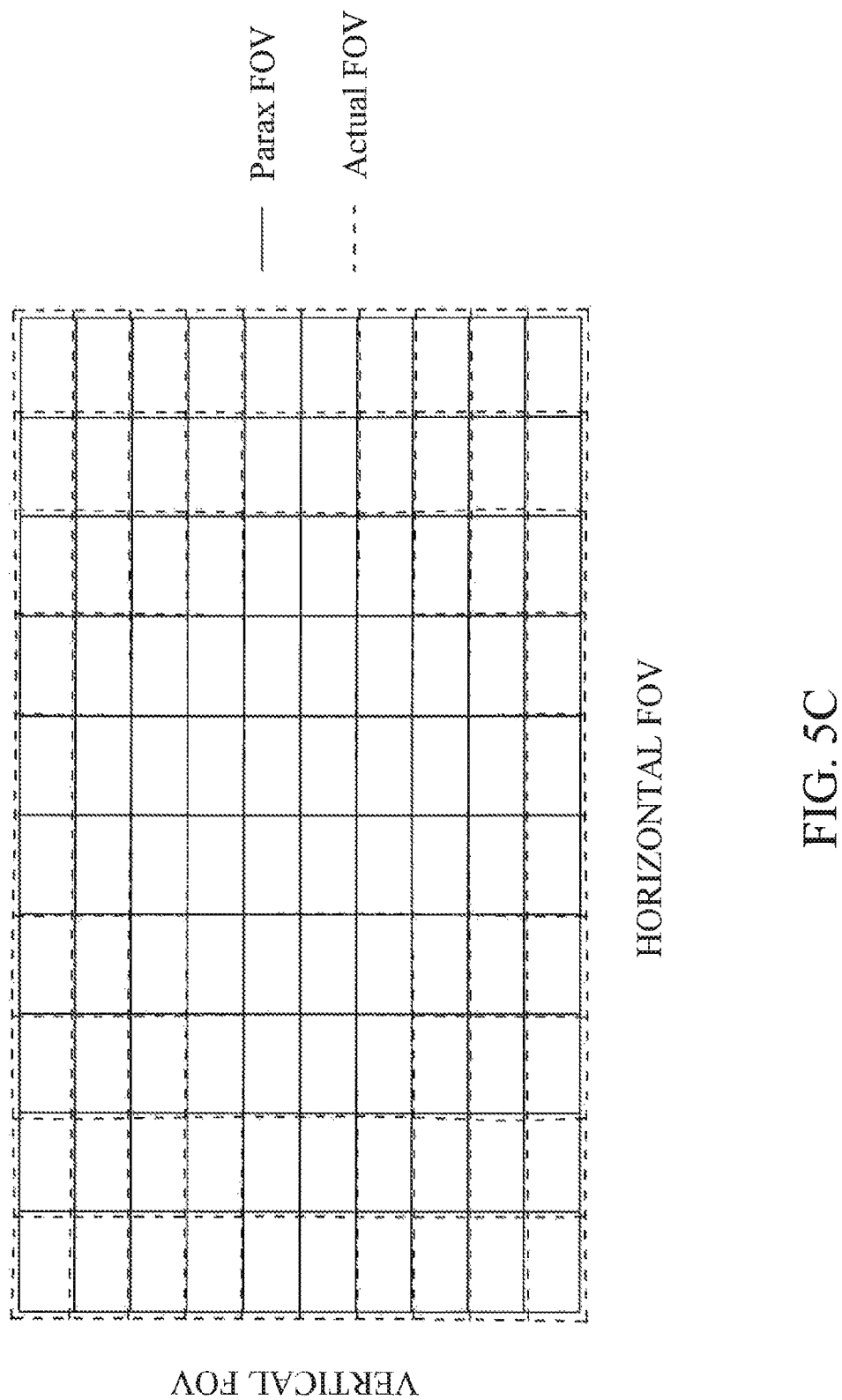
FIG. 5C is a TV distortion grid of the optical image capturing system according to the fifth embodiment of the present application.

Please refer to FIG. 5A, FIG. 5B, and FIG. 5C, FIG. 5A is a schematic view of the optical image capturing system according to the fifth embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a TV distortion grid of the optical image capturing system according to the fifth embodiment of the present application. As shown in FIG. 5A, in order from an object side to an image side, the optical image capturing system includes a aperture stop 500, first lens element 510, a second lens element 520, a third lens element 530, a fourth lens element 540, a fifth lens element 550, a sixth lens element 560, an IR-bandstop filter 570, an image plane 580, and an image sensing device 590.

The first lens element 510 has a positive refractive power and it is made of plastic material. The first lens element 510 has a convex object-side surface 512 and a concave image-side surface 514, and both of the object-side surface 512 and the image-side surface 514 are aspheric.

The second lens element 520 has a negative refractive power and it is made of plastic material. The second lens element 520 has a convex object-side surface 522 and a concave image-side surface 524, and both of the object-side surface 522 and the image-side surface 524 are aspheric.

The third lens element 530 has a positive refractive power and it is made of plastic material. The third lens element 530 has a convex object-side surface 532 and a convex image-side surface 534, and both of the object-side surface 532 and the image-side surface 534 are aspheric.

The fourth lens element 540 has a positive refractive power and it is made of plastic material. The fourth lens element 540 has a concave object-side surface 542 and a convex image-side surface 544, and both of the object-side surface 542 and the image-side surface 544 are aspheric.

The fifth lens element 550 has a negative refractive power and it is made of plastic material. The fifth lens element 550 has a concave object-side surface 552 and a convex image-side surface 554, and both of the object-side surface 552 and the image-side surface 554 are aspheric.

The sixth lens element 560 has a negative refractive power and it is made of plastic material. The sixth lens element 560 has a convex object-side surface 562 and a concave image-side surface 564, both of the object-side surface 562 and the image-side surface 564 are aspheric, and each of the object-side surface 562 and the image-side surface 564 has inflection points.

The IR-bandstop filter 570 is made of glass material without affecting the focal length of the optical image capturing system and it is disposed between the sixth lens element 560 and the image plane 580.

In the fifth embodiment of the optical image capturing system, focal lengths of the second lens element 520, the third lens element 530, the fourth lens element 540, and the fifth lens element 550 are f2, f3, f4, and f5, respectively. The following relation is satisfied: |f2|+|f3|+|f4|+|f5|=39.7101 mm, |f1|+|f6|=10.7285 mm, and |f2|+|f3|+|f4|+|f5|>|f1|+|f6|.

In the fifth embodiment of the optical image capturing system, a central thickness of the fifth lens element 550 is TP5 and a central thickness of the sixth lens element 560 is TP6. The following relation is satisfied: TP5=0.3994 mm and TP6=0.8921 mm.

In the fifth embodiment of the optical image capturing system, the first lens element 510, the third lens element 530, and the fourth lens element 540 are convex lens elements, and focal lengths of the first lens element 510, the third lens element 530, and the fourth lens element 540 are f1, f3, and f4, respectively. A sum of focal lengths of all lens elements with positive refractive powers is ΣPP. The following relation is satisfied: ΣPP=f1+f3+f4=19.7878 mm and f1/(f1+f3+f4)=0.3138. Hereby, its favorable for allocating the positive refractive power of the first lens element 510 to others convex lens elements and the significant aberrations generated in the process of moving the incident light can be suppressed.

In the fifth embodiment of the optical image capturing system, focal lengths of the second lens element 520, the fifth lens element 550, and the sixth lens element 560 are f2, f5, and f6, respectively. A sum of focal lengths of all lens elements with negative refractive powers is ΣNP. The following relation is satisfied: ΣNP=f2+f5+f6=−30.6508 mm and f6/(f2+f5+f6)=0.1475. Hereby, it's favorable for allocating the negative refractive power of the sixth lens element to others concave lens elements.

Please refer to the following Table 9 and Table 10.

The detailed data of the optical image capturing system of the fifth embodiment is as shown in Table 9.

TABLE 9

Data of the optical image capturing system
f = 3.8293 mm; f/HEP = 2.0; HAF = 45 deg; tan(HAF) = 1

| Surface # | Curvature Radius | Thickness | Material | Index | Abbe # | Focal length |
|---|---|---|---|---|---|---|
| 0 | Object Plano | (INFINITY) | | | | |
| 1 | Ape. stop Plano | −0.1775 | | | | |
| 2 | Lens 1 2.45163 | 0.45637 | Plastic | 1.565 | 58 | 6.2089 |
| 3 | 7.59396 | 0.605272 | | | | |
| 4 | Lens 2 9.20477 | 0.23 | Plastic | 1.65 | 21.4 | −11.5891 |
| 5 | 4.10191 | 0.081038 | | | | |
| 6 | Lens 3 8.26682 | 0.719611 | Plastic | 1.565 | 58 | 11.1367 |
| 7 | −25.5153 | 0.284103 | | | | |
| 8 | Lens 4 −4.11016 | 0.741233 | Plastic | 1.565 | 58 | 2.4422 |
| 9 | −1.10031 | 0.057491 | | | | |
| 10 | Lens 5 −0.85234 | 0.399406 | Plastic | 1.65 | 21.4 | −14.5421 |
| 11 | −1.10975 | 0.05 | | | | |
| 12 | Lens 6 2.19753 | 0.892119 | Plastic | 1.583 | 30.2 | −4.5196 |
| 13 | 1.01907 | 0.7 | | | | |
| 14 | IR-bandstop filter Plano | 0.2 | | 1.517 | 64.2 | |
| 15 | Plano | 0.566912 | | | | |
| 16 | Image plane Plano | 0.016446 | | | | |

Reference wavelength (d-line) = 587.5 nm

As for the parameters of the aspheric surfaces of the fifth embodiment, reference is made to Table 10.

TABLE 10

Aspheric Coefficients

| Surface # | 2 | 3 | 4 | 5 | 6 | 7 |
|---|---|---|---|---|---|---|
| k= | −6.708971 | 0.236639 | −50 | −21.082087 | −50 | 50 |
| A4= | 5.68782E−02 | −8.72180E−03 | −5.79389E−02 | −4.23936E−02 | −4.73933E−02 | −3.10471E−02 |
| A6= | −2.72634E−02 | −1.65776E−02 | −1.05562E−02 | 1.34494E−02 | 9.53978E−03 | −4.27521E−03 |
| A8= | 1.56637E−02 | 9.45562E−03 | −4.35616E−03 | −1.28797E−02 | 4.18082E−03 | −1.11608E−03 |
| A10= | −1.07940E−02 | −1.22640E−02 | −9.04232E−03 | 2.26051E−03 | −1.93654E−03 | −1.32017E−03 |
| A12= | | | | | | |
| A14= | | | | | | |

| Surface # | 8 | 9 | 10 | 11 | 12 | 13 |
|---|---|---|---|---|---|---|
| k= | −8.505141 | −3.098627 | −3.307933 | −2.9653 | −18.96969 | −4.723456 |
| A4= | −3.65336E−02 | −5.89622E−02 | −3.67097E−02 | −1.31097E−02 | −2.07599E−02 | −1.62875E−02 |
| A6= | −7.29941E−04 | 8.52552E−04 | 5.66890E−03 | 8.71373E−04 | 1.45510E−03 | 2.12529E−03 |
| A8= | −2.04864E−03 | 2.33099E−03 | −2.71150E−04 | −4.86806E−04 | −5.43436E−04 | −2.26702E−04 |
| A10= | −1.32217E−03 | −5.25962E−04 | −2.03627E−04 | −9.68878E−05 | 2.94367E−05 | 2.29245E−06 |
| A12= | | | −4.18550E−05 | −1.13450E−05 | 1.91096E−05 | 1.26375E−06 |
| A14= | | | −6.12090E−05 | 1.12028E−05 | −2.29183E−06 | −7.06526E−08 |

In the fifth embodiment, the presentation of the aspheric surface formula is similar to that in the first embodiment. Besides, the definitions of parameters in following tables are equal to those in the first embodiment, so the repetitious details need not be given here.

The following content may be deduced from Table 9 and Table 10.

| Fifth embodiment | | | |
|---|---|---|---|
| |f/f1| | 0.6167 | InRS51 | −1.201 |
| f1/ΣPP | 0.3138 | InRS52 | −1.2018 |
| f6/ΣNP | 0.1475 | InRS61 | −0.2802 |
| IN12/f | 0.1581 | InRS62 | 0.0188 |
| HOS/f | 1.5669 | Inf61 | 0.1548 |
| ΣPPR | 2.5286 | HVT61 | 1.4163 |
| |ΣNPR| | 1.4410 | Inf62 | 0.6619 |
| ΣPPR/|ΣNPR| | 1.7547 | HVT62 | 2.3896 |
| (R11 − R12)/(R11 + R12) | 0.3663 | |InRS52|/TP5 | 3.0090 |
| HOS | 6 | |InRS52| + |InRS61| | 1.4820 |
| HOS/HOI | 1.5334 | |InRS62|/TP6 | 0.0211 |
| InS/HOS | 0.9704 | Inf62/|InRS62| | 35.2074 |
| InTL/HOS | 0.7528 | HVT62/HOI | 0.6107 |
| ΣTP/InTL | 0.7613 | HVT62/HOS | 0.3983 |
| (TP1 + IN12)/TP2 | 4.6161 | HVT62/(Inf62 + CT6) | 1.5377 |
| (TP6 + IN56)/TP5 | 2.3588 | |TDT| | 0.56 |
| (TP2 + TP3 + TP4)/ΣTP | 0.5410 | |ODT| | 2.107 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising:
   a first lens element with a positive refractive power;
   a second lens element with a refractive power;
   a third lens element with a refractive power;
   a fourth lens element with a refractive power;
   a fifth lens element with a refractive power;
   a sixth lens element with a negative refractive power and at least one of the image-side and the object-side surfaces of the sixth lens element having at least one inflection point; and
   an image plane;
   wherein the optical image capturing system comprises six lens elements with refractive powers, at least one of the second through fifth lens elements has a positive refractive power, the object-side surface and the image-side surface of the first lens element are aspheric, the object-side surface and the image-side surface of the sixth lens element are aspheric, focal lengths of the first through sixth lens elements are f1, f2, f3, f4, f5, and f6, respectively, a focal length of the optical image capturing system is f, an entrance pupil diameter of the optical image capturing system is HEP, half of a maximal view angle of the optical image capturing system is HAF, a distance from the object-side surface of the first lens element to the image plane is HOS, and the following relation is satisfied: 0≤|f/f1|≤2, 1.2≤f/HEP≤2.8, 0.4≤|tan(HAF)|≤1.5, and 0.5≤HOS/f≤2.5.

2. The optical image capturing system of claim 1, wherein the following relation is satisfied: |f2|+|f3|+|f4|+|f5|>|f1|+|f6|.

3. The optical image capturing system of claim 1, wherein TV distortion for image formation in the optical image capturing system is TDT and the following relation is satisfied: |TDT|<1.5%.

4. The optical image capturing system of claim 3, wherein optical distortion for image formation in the optical image capturing system is ODT and the following relation is satisfied: |ODT|≤2.5%.

5. The optical image capturing system of claim 1, wherein a distance from the object-side surface of the first lens element to the image-side surface of the sixth lens element is InTL, a distance from the object-side surface of the first lens element to the image plane is HOS, and the following relation is satisfied: 0.6≤InTL/HOS≤0.95.

6. The optical image capturing system of claim 1, wherein on the optical axis, a total central thickness of all lens elements with refractive powers is ΣTP, a distance from the object-side surface of the first lens element to the image-side surface of the sixth lens element is InTL, and the following relation is satisfied: 0.45≤ΣTP/InTL≤0.95.

7. The optical image capturing system of claim 1, wherein a distance in parallel with an optical axis from a maximum effective diameter position to an axial point on the image-side surface of the sixth lens element is InRS62, a central thickness of the sixth lens element is TP6, and the following relation is satisfied: 0≤InRS62/TP6≤3.

8. The optical image capturing system of claim 1, further comprises an aperture stop, wherein a distance from the aperture stop to the image plane on the optical axis is InS, and the following relation is satisfied: 0.6≤InS/HOS≤1.1.

9. The optical image capturing system of claim 8, further comprises an image sensing device disposed on the image plane, half of a diagonal of an effective detection field of the image sensing device is HOI, and the following relation is satisfied: HOS/HOI≤3.

10. An optical image capturing system, from an object side to an image side, comprising:
   a first lens element with a positive refractive power;
   a second lens element with a negative refractive power;
   a third lens element with a refractive power;
   a fourth lens element with a refractive power;
   a fifth lens element with a refractive power;
   a sixth lens element with a negative refractive power and at least one of the image-side and the object-side surfaces of the sixth lens element having at least one inflection point; and
   an image plane;
   wherein the optical image capturing system comprises six lens elements with refractive powers, at least one of the third through fifth lens elements has a positive refractive power, the object-side surface and the image-side surface of the first lens element are aspheric, the object-side surface and the image-side surface of the sixth lens element are aspheric, focal lengths of the first through sixth lens elements are f1, f2, f3, f4, f5, and f6, respectively, a focal length of the optical image capturing system is f, an entrance pupil diameter of the optical image capturing system is HEP, half of a maximal view angle of the optical image capturing system is HAF, a distance from the object-side surface of the first lens element to the image plane is HOS, TV distortion and optical distortion for image formation in the optical image capturing system are TDT and ODT, respectively, and the following relation is satisfied: 0≤|f/f1|≤2, 1.2≤f/HEP≤2.8, 0.4≤|tan(HAF)|≤1.5, 0.5≤HOS/f≤2.5, |TDT|<1.5%, and |ODT|≤2.5%.

11. The optical image capturing system of claim 10, wherein the third lens element has a positive refractive power, the fourth lens element has a positive refractive power, and the fifth lens element has a positive refractive power.

12. The optical image capturing system of claim 10, wherein a distance in parallel with an optical axis from a maximum effective diameter position to an axial point on the image-side surface of the sixth lens element is InRS62, a central thickness of the sixth lens element is TP6, and the following relation is satisfied: $0<|InRS62|/TP6\leq3$.

13. The optical image capturing system of claim 10, wherein a distance in parallel with an optical axis from a maximum effective diameter position to an axial point on the image-side surface of the fifth lens element is InRS52, a central thickness of the fifth lens element is TP5, and the following relation is satisfied: $0<|InRS52|/TP5\leq5$.

14. The optical image capturing system of claim 10, wherein the image-side surface of the sixth lens element comprises at least one critical point C which is tangent to a plane perpendicular to the optical axis, a distance perpendicular to the optical axis between the critical point C and the optical axis is HVT62, and the following relation is satisfied: $0<HVT62/HOS\leq1$.

15. The optical image capturing system of claim 12, wherein a reference point is a position on the optical axis projected perpendicularly by an inflection point on the image-side surface of the sixth lens element, a distance in parallel with an optical axis from an axial point on the image-side surface of the sixth lens element to the reference point is Inf62, and the following relation is satisfied: $0<Inf62/|InRS62|\leq120$.

16. The optical image capturing system of claim 10, wherein a distance in parallel with an optical axis from a maximum effective diameter position to an axial point on the object-side surface of the sixth lens element is InRS61, a distance in parallel with an optical axis from a maximum effective diameter position to an axial point on the image-side surface of the fifth lens element is InRS52, and the following relation is satisfied: $0\text{ mm}\leq|InRS52|+|InRS61|\leq2.5\text{ mm}$.

17. The optical image capturing system of claim 10, wherein on the optical axis, a total central thickness of all lens elements with refractive powers is ΣTP, a central thickness of the third lens element is TP3, a central thickness of the fourth lens element is TP4, a central thickness of the fifth lens element is TP5, and the following relation is satisfied: $0<(TP3+TP4+TP5)/\Sigma TP\leq0.85$.

18. The optical image capturing system of claim 10, wherein a distance between the first lens element and the second lens element on the optical axis is IN12 and the following relation is satisfied: $0<IN12/f\leq0.25$.

19. The optical image capturing system of claim 10, wherein a distance between the first lens element and the second lens element on the optical axis is IN12, a central thickness of the first lens element on the optical axis is TP1, a central thickness of the second lens element is TP2, and the following relation is satisfied: $1\leq(TP1+IN12)/TP2\leq10$.

20. An optical image capturing system, from an object side to an image side, comprising:
a first lens element with a positive refractive power having a convex object-side surface adjacent to an optical axis;
a second lens element with a negative refractive power;
a third lens element with a positive refractive power having a convex object-side surface adjacent to the optical axis;
a fourth lens element with a positive refractive power;
a fifth lens element with a negative refractive power having a convex image-side surface adjacent to the optical axis;
a sixth lens element with a negative refractive power and at least one of the image-side and the object-side surfaces of the sixth lens element having at least one inflection point; and
an image plane;
wherein the optical image capturing system comprises six lens elements with refractive powers, the object-side surface and the image-side surface of the first lens element are aspheric, the object-side surface and the image-side surface of the sixth lens element are aspheric, focal lengths of the first through sixth lens elements are f1, f2, f3, f4, f5, and f5, respectively, a focal length of the optical image capturing system is f, an entrance pupil diameter of the optical image capturing system is HEP, half of a maximal view angle of the optical image capturing system is HAF, a distance from the object-side surface of the first lens element to the image plane is HOS, optical distortion and TV distortion for image formation in the optical image capturing system are ODT and TDT, respectively, and the following relation is satisfied: $0\leq|f/f1|\leq2$, $1.2\leq f/HEP\leq2.8$, $0.4\leq|\tan(HAF)|\leq1.5$, $0.5\leq HOS/f\leq2.5$, $|TDT|<1.5\%$, and $|ODT|\leq2.5\%$.

21. The optical image capturing system of claim 20, a ratio f/fp of the focal length f of the optical image capturing system to a focal length fp of each of lens elements with a positive refractive power is PPR, a ratio f/fn of the focal length f of the optical image capturing system to a focal length fn of each of lens elements with a negative refractive power is NPR, a sum of the PPR of all lens elements with positive refractive powers is ΣPPR, a sum of the NPR of all lens elements with negative refractive powers is ΣNPR, and the following relation is satisfied: $0.5\leq\Sigma PPR/|\Sigma NPR|\leq2$.

22. The optical image capturing system of claim 20, wherein a distance in parallel with an optical axis from a maximum effective diameter position to an axial point on the image-side surface of the sixth lens element is InRS62, a central thickness of the sixth lens element is TP6, a distance in parallel with an optical axis from a maximum effective diameter position to an axial point on the image-side surface of the fifth lens element is InRS52, a central thickness of the fifth lens element is TP5, the image-side surface of the sixth lens element comprises at least one critical point C which is tangent to a plane perpendicular to the optical axis, a distance perpendicular to the optical axis between the critical point C and the optical axis is HVT62, and the following relation is satisfied: $0<|InRS62|/TP6\leq3$, $0<|InRS52|/TP5\leq5$, and $0<HVT62/HOS\leq1$.

23. The optical image capturing system of claim 20, further comprising an aperture stop, an image plane, and an image sensing device disposed on the image plane, wherein a distance from the aperture stop to the image plane on the optical axis is InS, a distance from the object-side surface of the first lens element to the image plane is HOS, and the following relation is satisfied: $0.6\leq InS/HOS\leq1.1$.

24. The optical image capturing system of claim 23, wherein length and width of the image sensing device are L and B, respectively, length of diagonal of the image sensing device is Dg, and the following relation is satisfied: $Dg\leq1/1.2$ inch and $L/B=16/9$.

25. The optical image capturing system of claim 23, wherein at least 8 million pixels are arranged on the image sensing device, size of the pixels is PS, and the following relation is satisfied: $PS \leq (1.4 \; \mu m)^2$.

* * * * *